(12) United States Patent
Dahod et al.

(10) Patent No.: US 10,492,110 B2
(45) Date of Patent: Nov. 26, 2019

(54) LONG TERM EVOLUTION RADIO ACCESS NETWORK

(71) Applicant: Altiostar Networks, Inc., Tewksbury, MA (US)

(72) Inventors: Ashraf M. Dahod, Andover, MA (US); Parvez Khan, Andover, MA (US); Si Nguyen, Winchester, MA (US); Kuntal Chowdhury, Andover, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 16/017,612

(22) Filed: Jun. 25, 2018

(65) Prior Publication Data

US 2018/0310207 A1    Oct. 25, 2018

Related U.S. Application Data

(63) Continuation of application No. 14/179,421, filed on Feb. 12, 2014, now Pat. No. 10,009,803.

(60) Provisional application No. 61/763,927, filed on Feb. 12, 2013.

(51) Int. Cl.
| | | |
|---|---|---|
| *H04W 36/00* | (2009.01) | |
| *H04W 80/02* | (2009.01) | |
| *H04W 88/08* | (2009.01) | |
| *H04W 76/12* | (2018.01) | |
| *H04W 72/04* | (2009.01) | |

(52) U.S. Cl.
CPC ....... *H04W 36/0055* (2013.01); *H04W 72/04* (2013.01); *H04W 76/12* (2018.02); *H04W 80/02* (2013.01); *H04W 88/085* (2013.01)

(58) Field of Classification Search
None
See application file for complete search history.

(56) References Cited

U.S. PATENT DOCUMENTS

| | | |
|---|---|---|
| 5,923,650 A | 7/1999 | Chen et al. |
| 8,531,947 B2 | 9/2013 | Zhao et al. |
| 8,804,744 B2 | 8/2014 | Gao et al. |

(Continued)

FOREIGN PATENT DOCUMENTS

| | | |
|---|---|---|
| CN | 101379839 A | 3/2009 |
| CN | 102396262 A | 3/2012 |

(Continued)

OTHER PUBLICATIONS

"International Search Report received for PCT Patent International Application No. PCT/US2017/026792", dated Jul. 17, 2017, 11 pages.

(Continued)

*Primary Examiner* — Saba Tsegaye
(74) *Attorney, Agent, or Firm* — Mintz Levin Cohn Ferris Glovsky and Popeo, P.C.

(57) ABSTRACT

A system, a method, and a computer program product for coordinating communication of data packets between a user device and a core network are disclosed. The system includes a first device communicatively coupled to the core network, a second device communicatively coupled to the first device. The second device receives signals from the user device. The first device and the second device share at least one functionality associated with layer 2 of a long term evolution radio access network.

19 Claims, 30 Drawing Sheets

(56) References Cited

U.S. PATENT DOCUMENTS

| | | | |
|---|---|---|---|
| 9,288,823 B2 | 3/2016 | Lei et al. | |
| 9,439,095 B2 | 9/2016 | He et al. | |
| 9,504,029 B2 | 11/2016 | Yang et al. | |
| 9,788,307 B2 | 10/2017 | Yang et al. | |
| 9,813,219 B2 | 11/2017 | Yang et al. | |
| 10,009,803 B2 | 6/2018 | Dahod et al. | |
| 2002/0172178 A1 | 11/2002 | Suzuki et al. | |
| 2003/0235171 A1 | 12/2003 | Lundstrom et al. | |
| 2009/0201813 A1 | 8/2009 | Speight | |
| 2009/0219951 A1 | 9/2009 | Chun et al. | |
| 2009/0252148 A1 | 10/2009 | Dolganow et al. | |
| 2010/0054231 A1 | 3/2010 | Dolganow et al. | |
| 2010/0062781 A1 | 3/2010 | Dolganow et al. | |
| 2010/0067489 A1 | 3/2010 | Pelletier et al. | |
| 2010/0113000 A1 | 5/2010 | Yao et al. | |
| 2010/0260096 A1 | 10/2010 | Ulupinar et al. | |
| 2010/0260097 A1 | 10/2010 | Ulupinar et al. | |
| 2011/0034175 A1 | 2/2011 | Fong et al. | |
| 2011/0242975 A1 | 10/2011 | Zhao et al. | |
| 2011/0267951 A1 | 11/2011 | Stanwood et al. | |
| 2011/0310839 A1* | 12/2011 | Kenington | H04W 36/0072 370/331 |
| 2012/0163298 A1 | 6/2012 | Zhou et al. | |
| 2012/0188953 A1 | 7/2012 | Won et al. | |
| 2012/0230248 A1 | 9/2012 | Gao et al. | |
| 2012/0257581 A1 | 10/2012 | De | |
| 2012/0263120 A1 | 10/2012 | Gopalakrishnan et al. | |
| 2012/0300710 A1 | 11/2012 | Li et al. | |
| 2012/0300747 A1 | 11/2012 | Westberg et al. | |
| 2013/0051329 A1 | 2/2013 | Take | |
| 2013/0083730 A1 | 4/2013 | Gaal et al. | |
| 2013/0163524 A1* | 6/2013 | Shatzkamer | H04L 69/22 370/329 |
| 2013/0188619 A1 | 7/2013 | Dinan et al. | |
| 2013/0201890 A1 | 8/2013 | Swaminathan et al. | |
| 2013/0223272 A1 | 8/2013 | Tao et al. | |
| 2013/0272181 A1 | 10/2013 | Venkatachalam et al. | |
| 2013/0301609 A1 | 11/2013 | Smith et al. | |
| 2014/0010125 A1 | 1/2014 | Tillman et al. | |
| 2014/0018090 A1* | 1/2014 | Khoryaev | H04W 52/04 455/452.1 |
| 2014/0029458 A1 | 1/2014 | Ye | |
| 2014/0043980 A1 | 2/2014 | Anthony et al. | |
| 2014/0120936 A1 | 5/2014 | Chen et al. | |
| 2014/0120947 A1* | 5/2014 | Siomina | G01S 5/0221 455/456.1 |
| 2014/0204895 A1 | 7/2014 | Frederiksen et al. | |
| 2014/0226481 A1 | 8/2014 | Dahod et al. | |
| 2014/0233413 A1 | 8/2014 | Dahod et al. | |
| 2014/0233459 A1 | 8/2014 | Dahod et al. | |
| 2014/0233479 A1 | 8/2014 | Dahod et al. | |
| 2015/0009923 A1 | 1/2015 | Lei et al. | |
| 2015/0312904 A1 | 10/2015 | Ma et al. | |
| 2015/0326456 A1 | 11/2015 | Dudda et al. | |
| 2015/0327236 A1 | 11/2015 | Lin | |
| 2015/0341923 A1 | 11/2015 | Yang et al. | |
| 2016/0057768 A1 | 2/2016 | Sun et al. | |
| 2016/0182286 A1 | 6/2016 | Lunden et al. | |
| 2016/0353430 A1 | 12/2016 | Chen et al. | |
| 2017/0048912 A1 | 2/2017 | Sharma et al. | |
| 2017/0181156 A1 | 6/2017 | Nguyen | |
| 2017/0295517 A1 | 10/2017 | Nguyen et al. | |
| 2017/0295591 A1 | 10/2017 | Nguyen et al. | |
| 2017/0318577 A1 | 11/2017 | Yang et al. | |
| 2018/0035436 A1 | 2/2018 | Sharma et al. | |
| 2018/0077587 A1 | 3/2018 | Al-Fanek et al. | |
| 2018/0123920 A1 | 5/2018 | Dudda et al. | |
| 2018/0167889 A1 | 6/2018 | Rajagopal et al. | |

FOREIGN PATENT DOCUMENTS

| | | |
|---|---|---|
| CN | 104137644 A | 11/2014 |
| EP | 1189388 A2 | 3/2002 |
| EP | 2200390 A2 | 6/2010 |
| EP | 2501141 A2 | 9/2012 |
| EP | 2523505 A1 | 11/2012 |
| EP | 2530988 A1 | 12/2012 |
| EP | 2747376 A1 | 6/2014 |
| EP | 2947903 A1 | 11/2015 |
| GB | 2525935 A | 11/2015 |
| JP | 2012-523805 A | 10/2012 |
| JP | 2014-515584 A | 6/2014 |
| WO | 2010/120828 A1 | 10/2010 |
| WO | 2011/080714 A2 | 7/2011 |
| WO | 2012/084636 A1 | 6/2012 |
| WO | 2012/139016 A2 | 10/2012 |
| WO | 2012/139664 A1 | 10/2012 |
| WO | 2012/163726 A1 | 12/2012 |
| WO | 2012/177763 A2 | 12/2012 |
| WO | 2013/029251 A1 | 3/2013 |
| WO | 2013/038167 A2 | 3/2013 |
| WO | 2013/116988 A1 | 8/2013 |
| WO | 2014/127054 A1 | 8/2014 |
| WO | 2014/130708 A1 | 8/2014 |
| WO | 2014/130709 A1 | 8/2014 |
| WO | 2014/130713 A1 | 8/2014 |
| WO | 2014/160709 A2 | 10/2014 |
| WO | 2014/160718 A1 | 10/2014 |
| WO | 2014/160722 A1 | 10/2014 |
| WO | 2015/167546 A1 | 11/2015 |
| WO | 2017/005854 A1 | 1/2017 |

OTHER PUBLICATIONS

"International Search Report received for PCT Patent International Application No. PCT/US2017/026793", dated Aug. 18, 2017, 9 pages.

"International Search Report received for PCT Patent International Application No. PCT/US2016/067271", dated Mar. 16, 2017, 4 pages.

"International Search Report received for PCT Patent International Application No. PCT/US2014/016123", dated Jul. 22, 2014, 04 pages.

"International Search Report received for PCT Patent International Application No. PCT/US2014/017456", dated Jul. 3, 2014, 04 pages.

"International Search Report received for PCT Patent International Application No. PCT/US2014/017459", dated Jul. 3, 2014, 04 pages.

"International Search Report received for PCT Patent International Application No. PCT/US2014/017464", dated Jun. 16, 2014, 04 pages.

"International Search Report received for PCT Patent International Application No. PCT/US2014/031725", dated Oct. 7, 2014, 03 pages.

"International Search Report received for PCT Patent International Application No. PCT/US2014/031744", dated Sep. 4, 2014, 04 Pages.

"International Search Report received for PCT Patent International Application No. PCT/US2014/031749", dated Aug. 5, 2014, 04 Pages.

"International Search Report received for PCT Patent International Application No. PCT/US2014/031753,", dated Aug. 14, 2014, 04 Pages.

"International Search Report received for PCT Patent International Application No. PCT/US2016/017585,", dated Dec. 2, 2016, 04 Pages.

"Japanese Office Action issued in Japanese Application No. 2015-558115", dated Aug. 8, 2017, 03 pages of English Translation and 04 pages of Japanese Office Action.

Balakrishnan, et al., "Improving Reliable Transport and Handoff Performance in Cellular Wireless Networks", ACM Wireless Networks Journal, vol. 1, No. 4, Dec. 1995, pp. 469-481.

Border, et al., "Performance Enhancing Proxies Intended to Mitigate Link-Related Degradations", Network Working Group, Request for Comments 3135, Jun. 1, 2001, pp. 1-45.

CATT, "L1 Support for Dual Connectivity", 3GPP TSG RAN WG1 Meeting #74, R1-1332026, Aug. 19-23, 2013, 3 pages.

(56) References Cited

OTHER PUBLICATIONS

Du, et al., "Downlink Scheduling for Multimedia Multicast/Broadcast over Mobile WiMAX: Connection-Oriented Multistate Adaptation", IEEE Wireless Communications, Aug. 2009, pp. 72-79.

Huawei, "Flow Control for Split Bearers—R3-140560", 3GPP TSG RAN WG3 Meeting #83bis, R3-140560, Mar. 31 to Apr. 4, 2014, 4 pages.

Kuwano, et al., "Optical Access Technologies for Mobile Radio Access Network.", IEICE Technical Report, vol. 112, No. 401, 2012, pp. 121-125.

Yoon, et al., "MuVi: A Multicast Video Delivery Scheme for 4G Cellular Networks", Mobile Computing and Networking, ACM, 2012, pp. 209-220.

* cited by examiner

LONG TERM EVOLUTION RADIO ACCESS NETWORK

CROSS-REFERENCE TO RELATED APPLICATIONS

The present application claims priority to and is a Continuation of U.S. patent application Ser. No. 14/179,421, filed Feb. 12, 2014, entitled, "Long Term Evolution Radio Access Network," which claims priority to and benefit under 35 U.S.C. § 119(e) to U.S. Provisional Patent Application No. 61/763,927, filed Feb. 12, 2013, and entitled "Long Term Evolution (LTE) Radio Access Network (Ran) Architecture," and incorporates their disclosures herein by reference in their entireties.

TECHNICAL FIELD

The subject matter described herein generally relates to data processing and in particular, to a long term evolution radio access network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications between users in existing digital cellular networks are typically defined and/or affected by various factors and/or parameters. These can include latency. Latency can be measured as either one-way (the time from the source sending a packet to the destination receiving it), or a round-trip delay time (the one-way latency from source to destination plus the one-way latency from the destination back to the source). While the existing LTE systems were designed to increase speed of communications by reducing significant latency that plagued its predecessors, such systems are still affected by a substantial amount of latency when mobile users setup communications via the LTE systems. Further, the current LTE systems involve components that are costly and expensive to install and maintain. Thus, there is need to provide an efficient and a cost-effective solution to existing LTE system that are capable of further reduction in latency.

SUMMARY

In some implementations, the current subject matter relates to a system (as well as a method and/or a computer program product) for coordinating communication of data packets between a user device and a core network. The system can include a first device communicatively coupled to the core network, and a second device communicatively coupled to the first device and configured for receiving signals from the user device. The first device and the second device can share at least one functionality associated with layer 2 of a long term evolution radio access network.

In some implementations, the current subject matter can also include one or more of the following optional features. The first device can include at least a portion of an evolved node (eNodeB) base station. The second device can include a remote radio head. The remote radio head can include a radio transmitter and a radio receiver. In some implementations, the functionality shared by the first and second device can be a packet data convergence protocol ("PDCP").

In some implementations, the first device and the second device can be communicatively coupled via a fronthaul Ethernet connection. The first device can be communicatively coupled with the core network using a backhaul connection. At least one message in a plurality of messages can traverse the fronthaul Ethernet connection. The messages can be associated with establishing communication between the user device and the core network. The plurality of messages can include messages relating to layer 1 and/or layer 2 configuration and messages relating to establishing a radio resource control ("RRC") connection. In some implementations, the messages relating to layer 1 and/or layer 2 configuration can be combined with messages relating to establishing the RRC connection, which can reduce latency associated with the Ethernet fronthaul connection. The messages can also include messages relating to re-establishing the RRC connection. Further, in some implementations, the messages relating to layer 1 and/or layer 2 configuration can be combined with the messages relating to re-establishing the remote radio control RRC connection, which can also reduce latency associated with the Ethernet fronthaul connection.

In some implementations, the system can include a third device communicatively coupled to the core network. The third device can include at least one of the following: at least a portion of an evolved node (eNodeB) base station and a remote radio head. The first device and the third device can be at least one of the following: a macro cell and a micro cell. The first device and the third device can exchange a plurality of messages relating to handover. The messages exchanged between the first device and the third device can also include messages relating to layer 1 and/or layer 2 configuration. In some implementations, the messages relating to handover can be combined with messages relating to layer 1 and/or layer 2 configuration. In some implementations, at least one of the second device and the third device, upon detecting a reconfiguration of a connection with the user device, can begin transmission of data on a downlink connection connecting the user device and at least one of the second device and the third device.

In some implementations, the current subject matter can relate to a system (as well as a method and/or a computer program product) for coordinating communication of data packets between a user device and a core network. The system can include a communications device that can be communicatively coupled to the core network via a backhaul connection. The communications device can have at least one functionality associated with layer 2 of a long term evolution radio access network. In some implementations, the communications device can include at least a portion of an evolved node (eNodeB) base station, where the functionality can relate to packet data convergence protocol (PDCP).

In some implementations, the current subject matter can relate to a system (as well as a method and/or a computer program product) for coordinating communication of data packets between a user device and a core network. The system can include a first communications device that can receive at least one data packet from the user device. The first communications device can have at least one functionality associated with layer 2 of a long term evolution radio access network. In some implementations, the first communications device can include a remote radio head. The remote radio head can include a radio transmitter and a radio receiver. The functionality can relate to packet data convergence protocol (PDCP). Further, in some implementations, the first communications device can be communicatively coupled to a second device using a fronthaul Ethernet connection for exchanging at least one message relating to layer 1 and/or layer 2 configuration and/or establishing a radio resource control (RRC) connection using PDCP.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter provide long term evolution radio access network having an intelligent capability.

I. Long Term Evolution Communications System

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
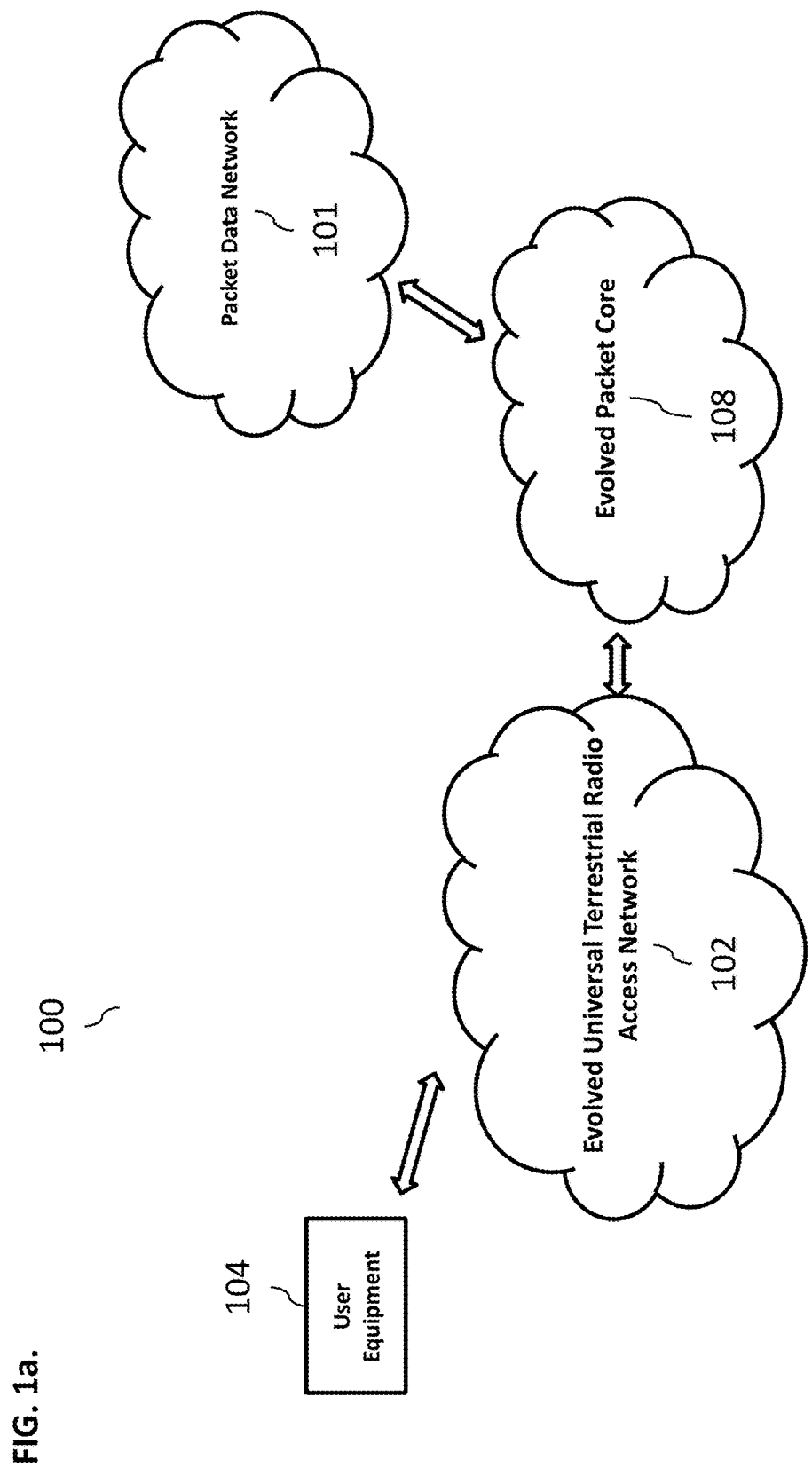
FIG. 1a illustrates an exemplary conventional long term evolution ("LTE") communications system.
Figure 1B:
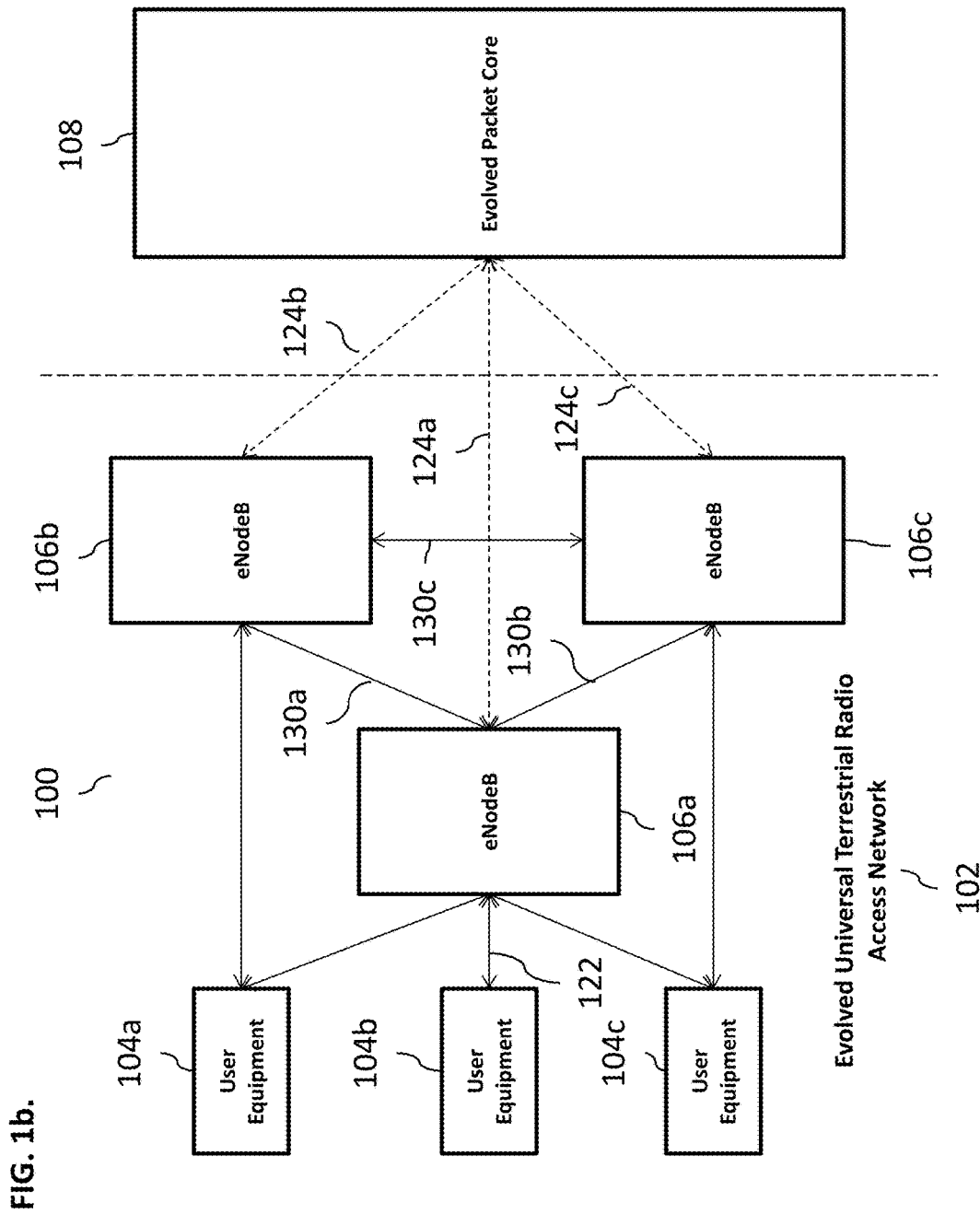

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
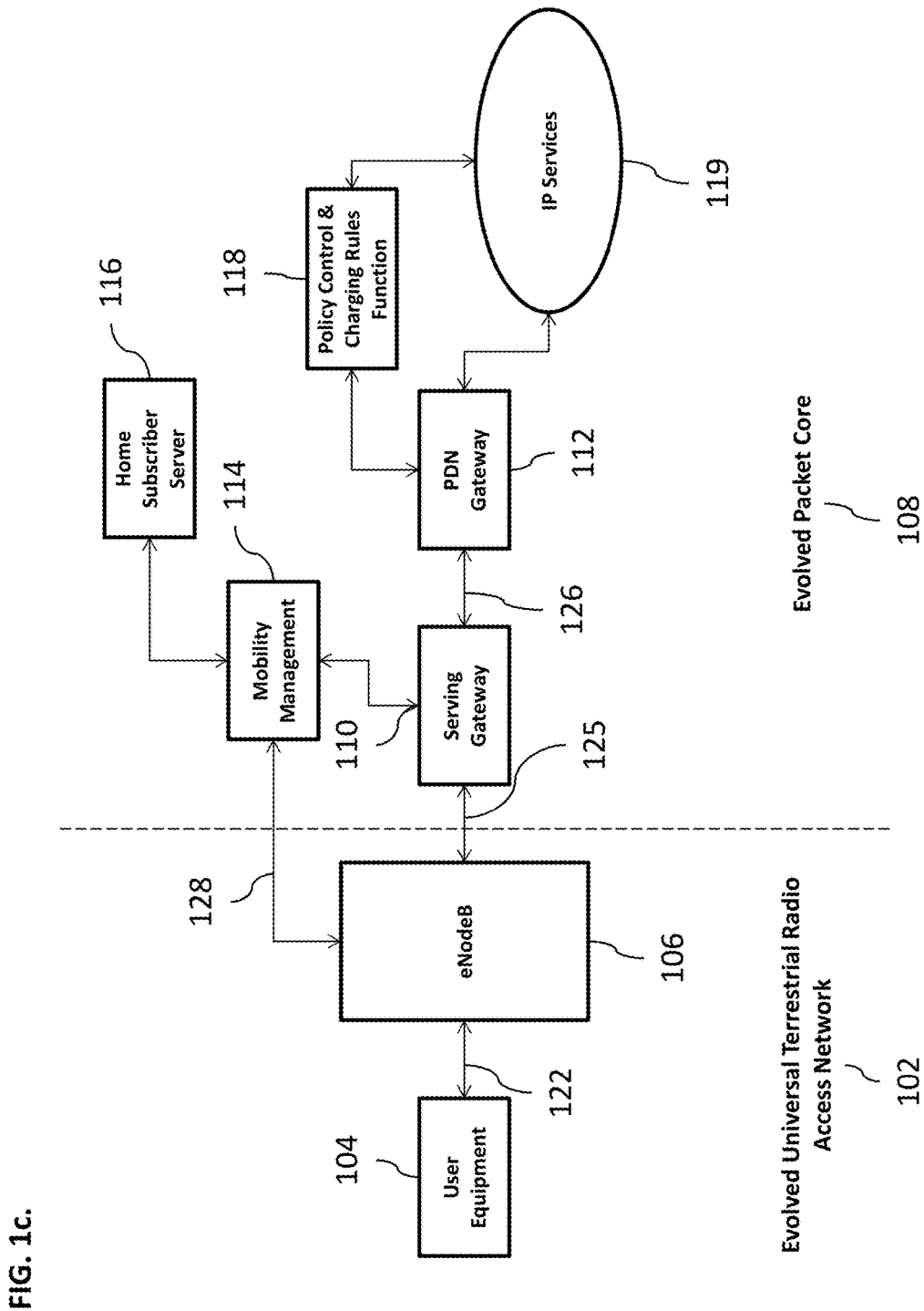

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. eNodeB

Figure 1D:
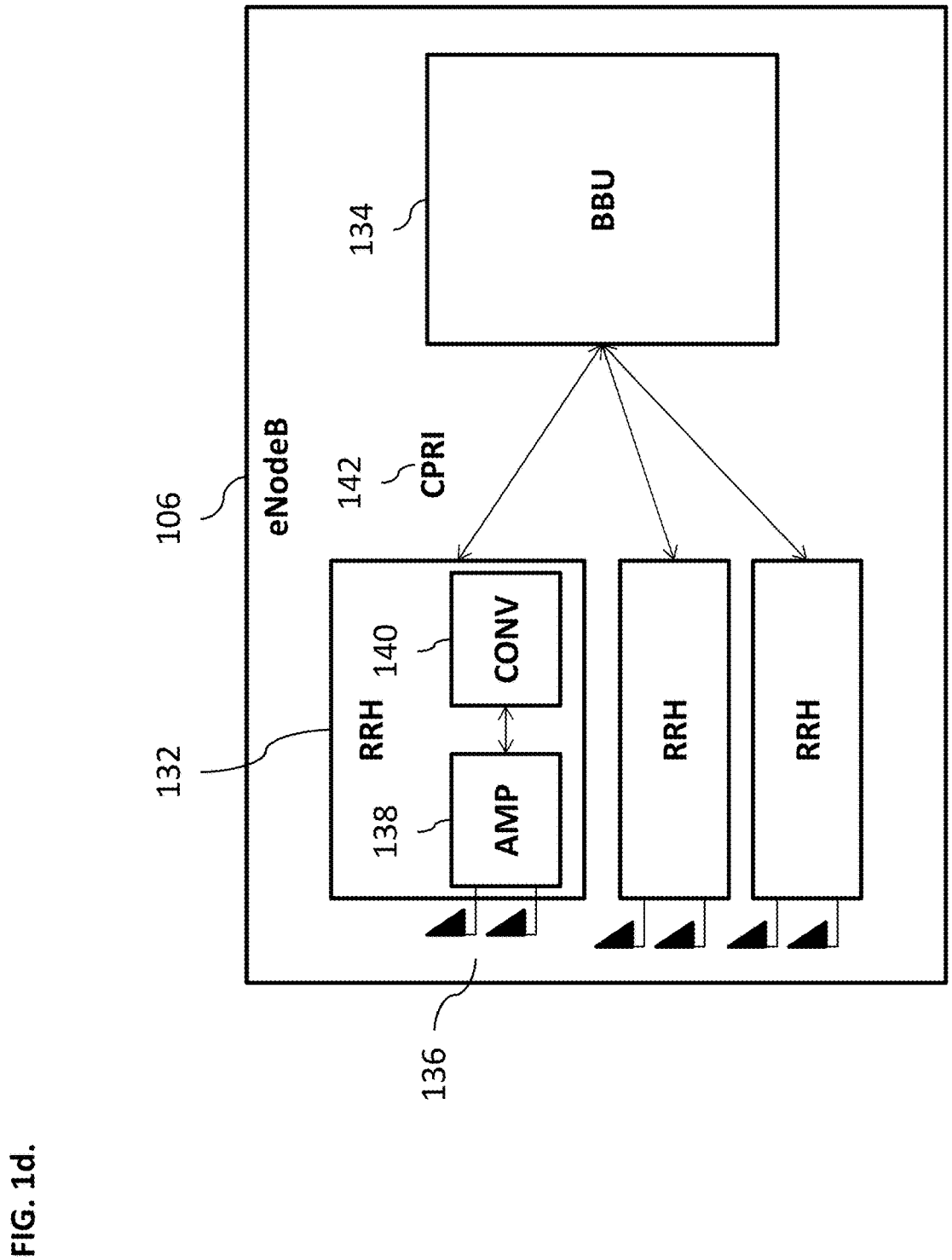

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
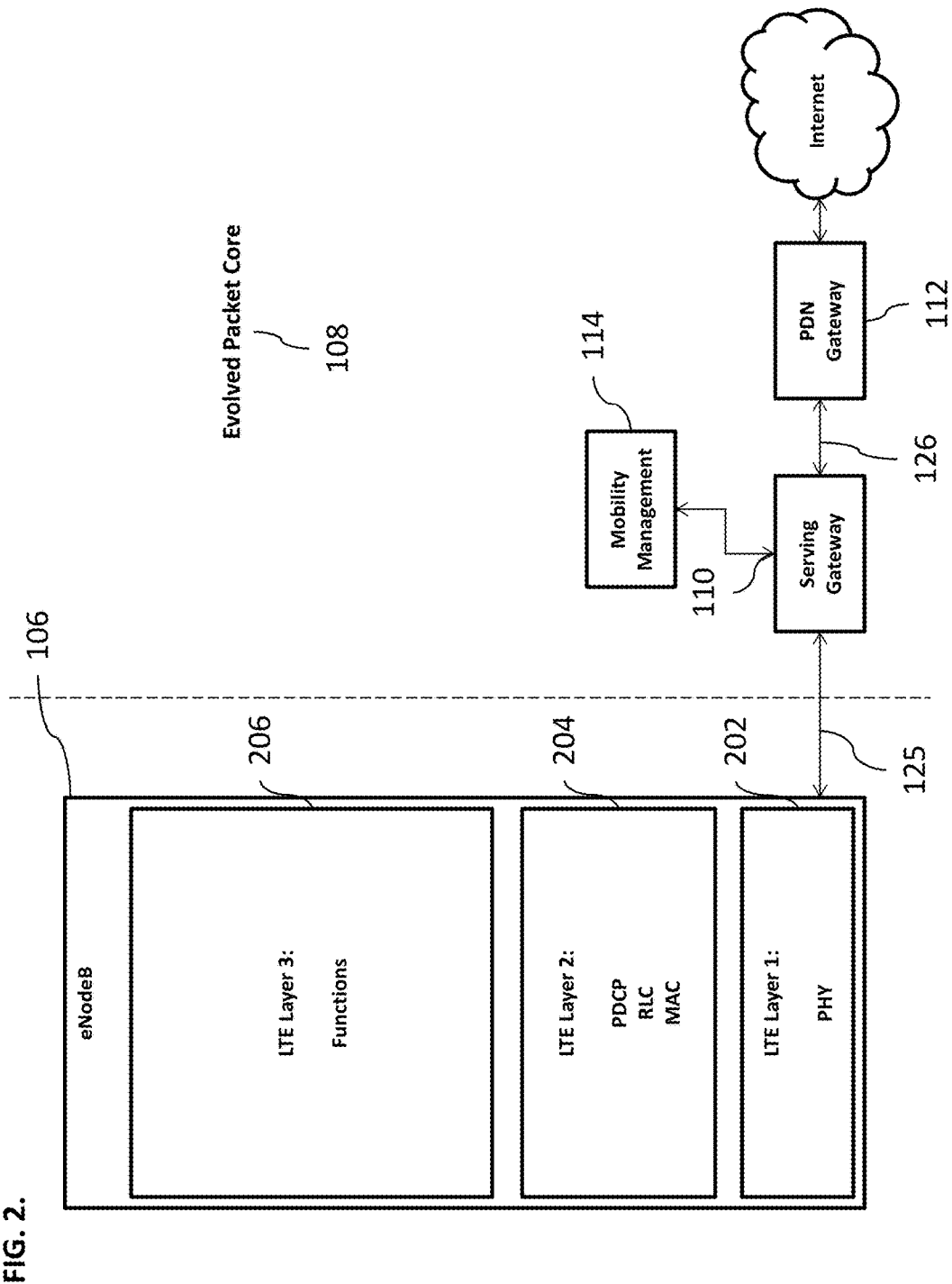
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

III. Intelligent LTE Radio Access Network

Figure 3:
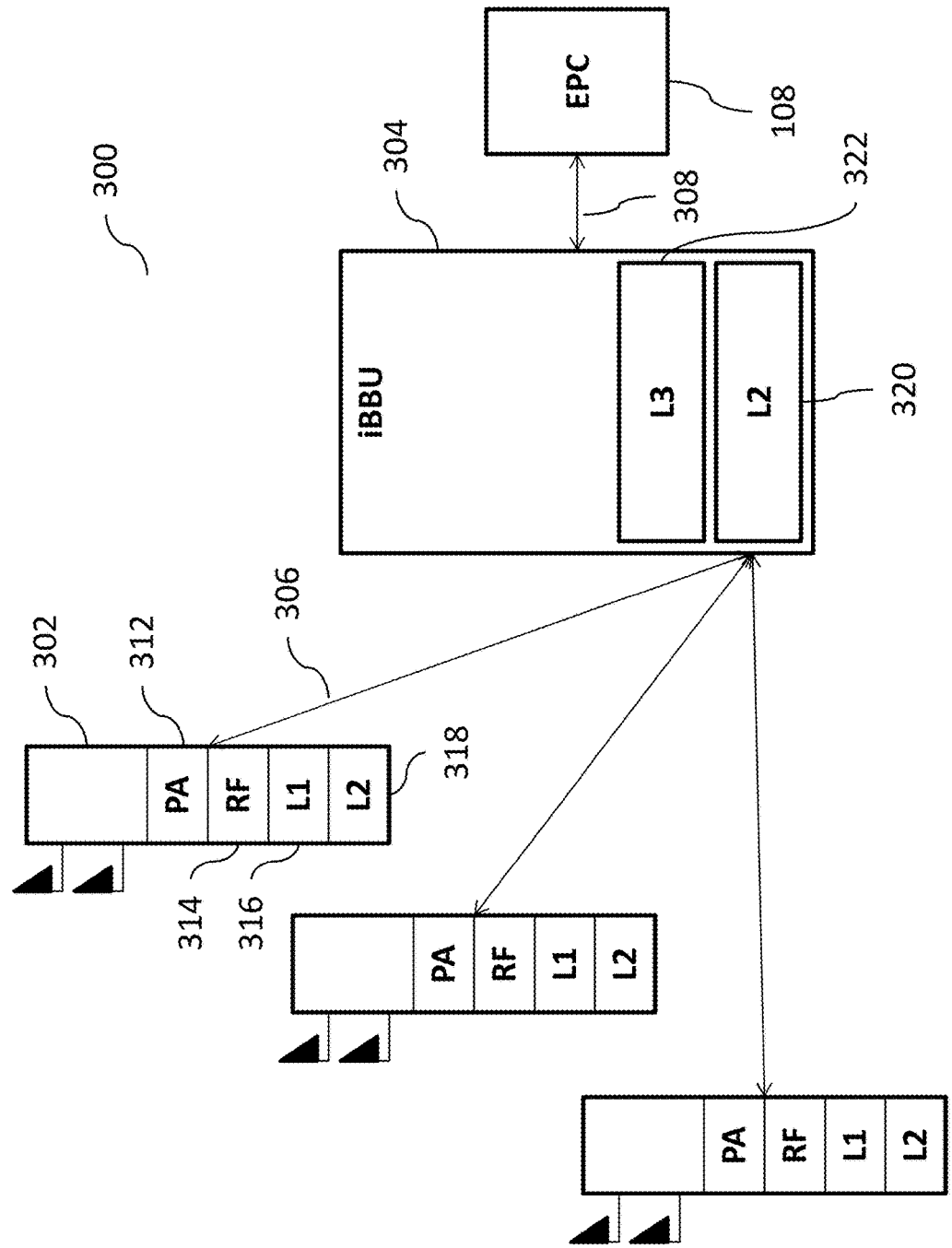
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

In some implementation, the system 300 can implement carrier aggregation ("CA") and coordinated multipoint ("CoMP") transmission features. The CA and CoMP features have been discussed in the 3GPP standards for 4G LTE-Advanced, Releases 10 and 11, respectively. Both features are designed to increase data throughput rate and designed to work with 4G LTE-Advanced. The following is a brief summary of each of these features.

A. Carrier Aggregation

The CA or channel aggregation enables multiple LTE carriers to be used together to provide high data rates that are required for 4G LTE-Advanced. These channels or carriers can be in contiguous elements of the spectrum, or they may be in different bands. The carriers can be aggregated using contiguous intra-band carrier aggregation, non-contiguous intra-band carrier aggregation, and inter-band non-contiguous carrier aggregation. In the contiguous intra-band carrier aggregation, carriers are adjacent to one another and aggregated channel can be considered by a user equipment as a single enlarged channel from a radio frequency ("RF") viewpoint and only one transceiver is required within the user equipment (usually, more transceivers are required where the channels are not adjacent). In the non-contiguous intra-band carrier aggregation typically requires two transceivers and a multi-carrier signal is not treated as a single signal. In the inter-band non-contiguous carrier aggregation, multiple transceivers are required to be present within a single user equipment, which can affect cost, performance and power. Additionally, this aggregation technique can require reduction in intermodulation and cross modulation from the two transceivers. When carriers are aggregated, each carrier can be referred to as a component carrier. There exist two categories of component carriers: a primary component carrier (i.e., main carrier in any group; there are a primary downlink carrier and an associated uplink primary component carrier), and a secondary component carrier (there are one or more secondary component carriers). Association between downlink primary and corresponding uplink primary component carriers is cell specific.

When LTE carrier aggregation is used, it is necessary to be able to schedule the data across the carriers and to inform the terminal of the DCI rates for different component carriers. Cross-carrier scheduling can be achieved individually via RRC signaling on a per component carrier basis or a per user equipment basis. When no cross-carrier scheduling is arranged, the downlink scheduling assignments can be achieved on a per carrier basis. For the uplink, an association can be created between one downlink component carrier and an uplink component carrier. When cross-carrier scheduling is active, the physical downlink shared channel ("PDSCH") on the downlink or the physical uplink shared channel ("PUSCH") on the uplink is transmitted on an associate component carrier other than the physical downlink control channel ("PDCCH"), the carrier indicator in the PDCCH provides the information about the component carrier used for the PDSCH or PUSCH. The PDSCH is the main data bearing channel allocated to users on a dynamic basis and that carries data in transport blocks ("TB") that correspond to a MAC packet data unit ("PDU"), which are passed from the MAC layer to the PHY layer once per transmission time interval ("TTI") (i.e., 1 ms). The PUSCH is a channel that carries user data and any control information necessary to decode information such as transport format indicators and MIMO parameters. The PDCCH is a channel that carries resource assignment for user equipments, which are contained in a downlink control information ("DCI") message.

There exist five deployment scenarios for CA. In the first scenario, cells (e.g., F1 and F2 cells) can be co-located and overlaid, thereby providing nearly the same coverage. Both layers provide sufficient coverage and mobility can be supported on both layers. In the second scenario, cells F1 and F2 can be co-located and overlaid, however, F2 cells have smaller coverage due to larger path losses, where only F1 cells provide sufficient coverage and F2 cells are used to improve throughput. Here, mobility is performed based on F1 cells coverage. In the third scenario, F1 and F2 cells are co-located and overlaid, however, F2 cells have smaller coverage due to larger path losses, where only F1 cells provide sufficient coverage and F2 cells are used to improve throughput. Here, mobility is based on F1 cells coverage. In the fourth scenario, F1 cells provide macro coverage and F2 cells' remote radio heads are used to improve throughput at hot spots, where mobility is again performed based on F1 cells coverage. In the fifth scenario, which is similar to the second scenario, frequency selective repeaters are deployed so that coverage is extended for one of the carrier frequencies. It is expected that F1 and F2 cells of the same eNodeB can be aggregated where coverage overlaps.

B. Coordinated Multipoint Transmission

The CoMP transmission feature is used to send and receive data to and from a user equipment from several points to ensure the optimum performance is achieved even at cell edges. CoMP enables dynamic coordination of transmission and reception over a variety of different base stations to improve overall quality for the user as well as improve utilization of the network. CoMP further requires close coordination between a number of geographically separated eNodeBs to provide joint scheduling and transmissions, joint processing of received signals, thereby allowing a user equipment at the edge of a cell to be served by two or more eNodeBs so as to improve signal reception/transmission and increase throughput.

There exist four deployment scenarios for CoMP. The first scenario involves a homogeneous network with intra-site CoMP. The second scenario also involves a homogeneous network but with high transmission power RRHs. The third scenario involves a heterogeneous network with low power RRHs within a macro cell coverage, where transmission/reception points created by the RRHs have different cell identifiers as the macro cell. The fourth scenario involves a heterogeneous network with low power RRHs within a macro cell coverage, where transmission/reception points created by the RRHs have the same cell identifiers as the macro cell.

The CoMP feature uses the following three scheme: coordinated scheduling/beamforming ("CS/CB"), joint processing ("JP"), and dynamic point selection ("DPS"). The CS/CB scheme coordinates steering of beams formed by different transmission points serving different user equipments. A user equipment can be semi-statically served by only one transmission point and data does not need to be passed around from transmission point to transmission point. The JP scheme involves simultaneous data transmission from multiple transmission points to a single user equipment or multiple user equipments in a time-frequency resource. JT scheme requires different transmission points to be completely synchronized in terms of the timing, TB format, PRB allocation and reference signals when transmitting data to a particular user equipment. The user equipment need not be aware that the transmission is coming from multiple transmission points. This scheme can require very tight coordination between schedulers or a single scheduler entity to achieve the required level of synchronization. The DPS scheme (a variant of the JT scheme) involves data transmission from one transmission point in a time-frequency resource, where the transmission point may change from one subframe to another.

C. Ethernet-Based Front Haul in Intelligent LTE RAN

Figure 4A:
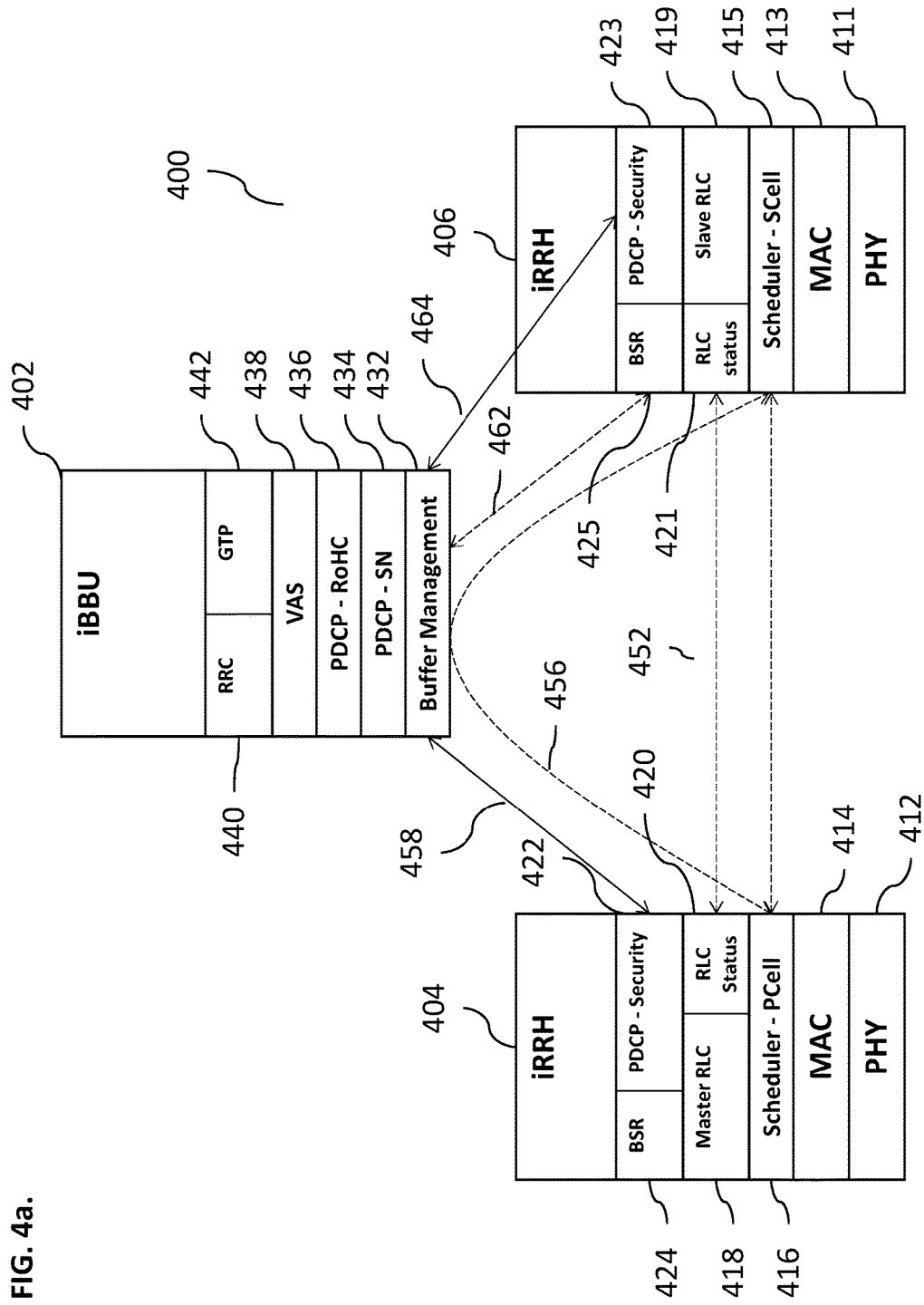
FIG. 4a illustrates an exemplary intelligent Long Term Evolution Radio Access Network implementing carrier aggregation feature, according to some implementations of the current subject matter.

FIG. 4a illustrates an exemplary system 400, according to some implementations of the current subject matter. The system 400 can be configured to implement 4G LTE-Advanced features, including carrier aggregation feature. The system 400 can include an intelligent baseband unit ("iBBU") 402, a primary cell ("Pcell") intelligent remote radio head 404 and one or more secondary cells ("Scell") intelligent remote radio heads 406. In LTE CA, the Pcell is the serving cell where the UE has an RRC connection with the radio access network. Pcell can only be changed through a successful execution of a handover procedure. Scell is a secondary cell that can be added/removed from the configured cells list when the UE moves into/out of its coverage area. The configuration of a Scell is done by RRC based on mobility measurement events triggered in the UE and sent to RRC.].

As shown in FIG. 4a, each iRRH 404 and 406 can both include the LTE layer 1 (i.e., the PHY layer) and have LTE layer 2 (i.e., MAC, PDCP, RLC) split among themselves as well as iBBU 402. The iRRH 404 can include a PHY layer 412, a MAC layer 414, a scheduler-Pcell component 416, a master RLC component 418, a RLC status component 420, a PDCP-security component 422, and a BSR component 424. Similarly, the iRRH 406 can include a PHY layer 411, a MAC layer 413, a scheduler-Scell component 415, a slave RLC component 419, a RLC status component 421, a PDCP-security component 423, and a BSR component 425. The iBBU 402 can include a buffer management component 432, a PDCP-SN component 434, a PDCP-RoHC component 436, a VAS component 438, an RRC component 440, and a GTP component 442.

The buffer management component 432 can implement use of buffer occupancy reports that can be received from the iRRH's to control flow of user data to the Pcell and/or Scell in order to enable in sequence delivery of the data to the user equipment. The PDCP-SN component 434 can perform sequence numbering of the PDCP service data units ("PDCP SDUs"). The PDCP robust header compression ("PDCP-RoHC") component 436 can perform IP header compression for voice-over-LTE service flows. The value added services ("VAS") component 438 can provide application intelligence in the eNodeB by performing shallow packet inspection and deep packet inspection of data flows. This component can also determine how a particular data flow can be treated. A shallow packet inspection ("SPI") can be performed by inspecting one or more headers of the data packet to determine information associated with the data packet. For example, the shallow packet inspection can inspect an IP header of the data packet in order to determine the source IP address of the data packet. In some implementations, based on the results of the shallow packet inspection, a deep packet inspection ("DPP") can be performed by examining other layers of the data packet. In some implementations, the payload of a data packet can be inspected to determine what resource blocks should be assigned to the data packet.

The iRRH 404 and the iRRH 406 can communicate with one another via an inter-iRRH interface, which can be a direct connection 452, or a connection that can be shared with a fronthaul connection 458. The iRRH 404 can communicate with the iBBU 402 using the fronthaul ("FH") connection 458 and the iRRH 406 can communicate with the iBBU 402 using FH connection 464.

In some implementations, the iBBU 402 can provide a centralized remote radio resource control ("RRC") using RRC component 440, thereby eliminating a need for a long-delay inter-RRC coordination and providing an ability to configure LTE layer 2 in iRRH 404 and 406. This capability can be implemented as part of the coordinated multipoint transmission feature, as discussed below.

As shown in FIG. 4a, the functionalities associated PDCP protocol can be split among the iBBU 402, the iRRH 404, and the iRRH 406. The PDCP-ROHC 436 (where ROHC refers to robust header compression protocol that is used to compress packets) and the PDCP-SN 434 (where SN refers to sequence numbering) together with buffer management component 432 in iBBU 402 can be referred to as PDPC-upper, and PDCP-security 422, 423 in iRRH 404, 406, respectively, can be referred to as PDCP-lower. By having PDCP-upper in the iBBU 402 and PDCP-lower in iRRH 404, 406, the PDCP functionalities can be centralized to handle the ROHC and sequence numbering functions by the iBBU 402, and ciphering functions by the iRRH (which refer to known functionalities of the PDPC). In some implementations, the PDCP-upper in iBBU 402 can also handle coordination of data flows to the schedulers in the iRRHs.

Further, by using PDCP-upper and PDCP-lower, flow control between iBBU 402 and iRRH 406 can be provided. The flow control can depend on an estimated data rate for the bearer. For example, on the downlink 462, the PDCP-upper can send compressed and numbered packets to Pcell iRRH 404 and Scell iRRH 406 in proportion based on buffer occupancy level and estimated data rate from the reports provided by PDCP-lower. In some implementations, the PDCP-lower can generate a report of a buffer occupancy level. This report can be generated periodically, upon request, automatically, manually, and/or on for any period of time. Based on the report, the PDCP-upper can estimate a buffer draining rate based on consecutive buffer occupancy reports (e.g., two reports), a time that elapsed between the reports and the additional data that was sent to the buffer between the reports.

The iBBU 402 can include a buffer management function 432 to support the in-sequenced delivery of PDCP packet data units ("PDCP PDU") and support value added services ("VAS") multi-queue implementation for the default bearer. The buffer management function 432 can detect buffer stalling in the Scell 406 and trigger a redirection of the staled PDCP PDU packets to the Pcell 404. PDCP-lower can detect outdated packets and discard them from its buffer. The in-sequenced delivery of PDCP PDUs can refer to a requirement for data flow transmitted in RLC acknowledged and unacknowledged modes. VAS multi-queue implementation can enable prioritization of data flows within the default bearer. In some implementations, the detection of buffer stalling can be based on an estimated buffer drain rate that can be derived from the buffer occupancy reports received from the PDCP-lower.

In some implementations, to perform redirection of packets, the PDCP-upper can tag each packet data unit with time-to-live information (which can refer to an amount of time before a data packet expires). Then, the PDCP-lower can remove the packet from its buffer when the time-to-live timer for that packet expires and inform the PDCP-upper of the deleted packet's number. The PDCP-upper can decide whether to resend the deleted packet to the same PDCP-lower and/or redirect the deleted packet to a PDCP-lower of another iRRH. The discarding of packets can be performed on the Pcell and/or the Scell and the packets can be redirected toward the Pcell and/or the Scell.

In some implementations, the RLC protocol handling can be split between iRRH 404 and iRRH 406, where the iRRH 404 can include a master RLC component 418 and the iRRH 406 can include a slave RLC component 419. The master RLC component 418 can allocate an RLC PDU sequence number to the slave RLC component 419, thereby centralizing RLC PDU sequence numbering process. In the current subject matter system, each RLC entity can maintain a list of unacknowledged PDUs that it has transmitted and thus, handle the ARQ procedures for only those unacknowledged PDUs that it has transmitted. This is because the RLC entity might not be aware of other PDUs that can be sent by other entities and/or might not have the original data to handle the re-transmissions of the unacknowledged PDUs. In some implementations, an RLC ARQ status PDU, which can be sent from a user equipment at a rate of once very few 10's of a millisecond, can be shared between the two RLC entities over the inter-iRRH interface, i.e., the direct connection 452 and/or a connection shared with fronthaul 458. In some implementations, the physical connection for this inter-iRRH interface can either be direct and/or through a L2 Ethernet switch. In some implementations, the above inter-iRRH interface can leverage industry standard stream control transport protocol ("SCTP") over IP. The application layer information exchange can be based on an inter-process communication protocols.

In some implementations, the inter-iRRH interface 452 can provide a low latency interface for sharing of the RLC status information PDUs as well as any other information between iRRHs 404 and 406. Channel state information ("CSI"), acknowledgement/non-acknowledgement ("ACK/NACK") signaling, precoding matrix indicator ("PMI"), and rank indicator ("RI") that are received by the Pcell iRRH 404 can be forwarded over the inter-iRRH interface 452 for sharing with an Scell scheduler 415 via the fronthaul or direct gigabit Ethernet ("GE") connection. This information can be available to the Scell scheduler on the same subframe that it was sent in order not to incur any impact the H-ARQ RTT, which can be targeted to be 8 ms. The Scell scheduler can also accommodate longer delay in obtaining the H-ARQ feedback and can impact H-ARQ round trip time on the Scell.

In some implementations, the inter-iRRH interface 452 can be used by the Scell iRRH 406 to inform the Pcell iRRH 404 which PUCCH resource to expect the arrival of the H-ARQ ACK/NACK feedback for a packet sent on the Scell (where the allocation of PUCCH resources is defined in the 3GPP Standards for 4G LTE). By way of a non-limiting example, the scheduler can be designed to determine which user equipment to schedule 2 ms in advance of when the data is transmitted over the air. The H-ARQ ACK/NACK can be sent from the user equipment 4 ms after the data has been received. Thus, to ensure the Pcell iRRH 404 is informed of the PUCCH resource usage before the downlink H-ARQ ACK/NACK information arrives from the user equipment, an exemplary one-way latency for the inter-iRRH interface 452 might not be more than 4 ms. As can be understood, the above is provided as an illustrative non-limiting, exemplary implementation of the current subject matter system. It should be further understood that the current subject matter system is not limited to specific data scheduling parameters and/or particular latency associated with transmission of data, and can be designed using any scheduling, latency and/or any other parameters.

In some implementations, the inter-iRRH transport 456 can be shared with the fronthaul and switched at the iBBU 402 and/or a physical direct connection 452 between the iRRHs 404, 406 using a gigabit Ethernet interface. When the inter-iRRH interface is configured as a switched connection 456 across the fronthaul, the fronthaul latency can be based on a very low latency transport such as in the case when the iBBU 402 and the iRRHs 404 and/or 406 are collocated and/or when based on LOS wireless transport such as MW, mmWave, FSO, when the iRRH's are geographically separated.

D. Coordinated Multipoint Transmission in Intelligent LTE RAN

Figure 4B:
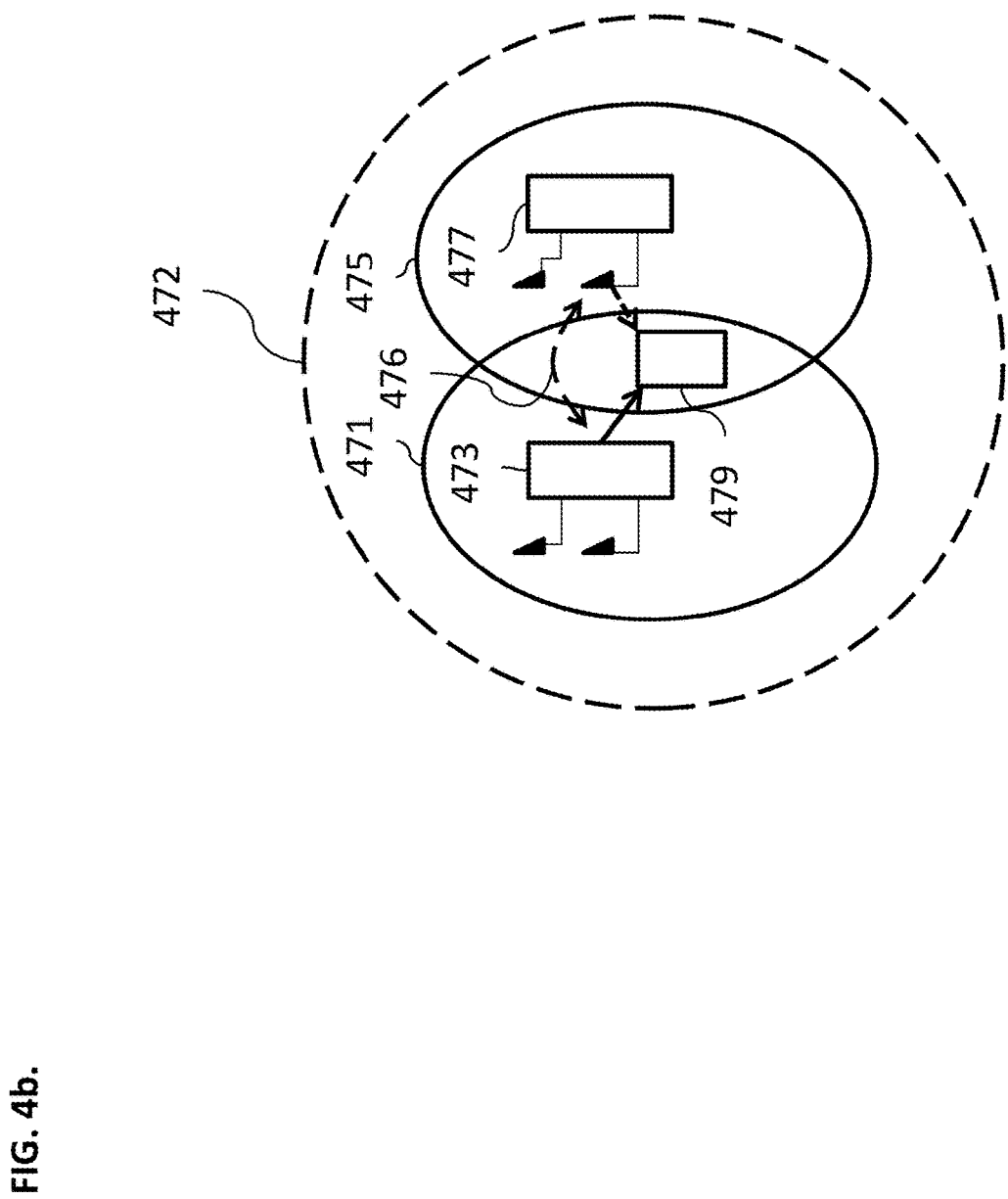
FIG. 4b-c illustrate exemplary dynamic point selection and coordinated scheduling/beam-forming in the Long Term Evolution Radio Access Network.
Figure 4C:
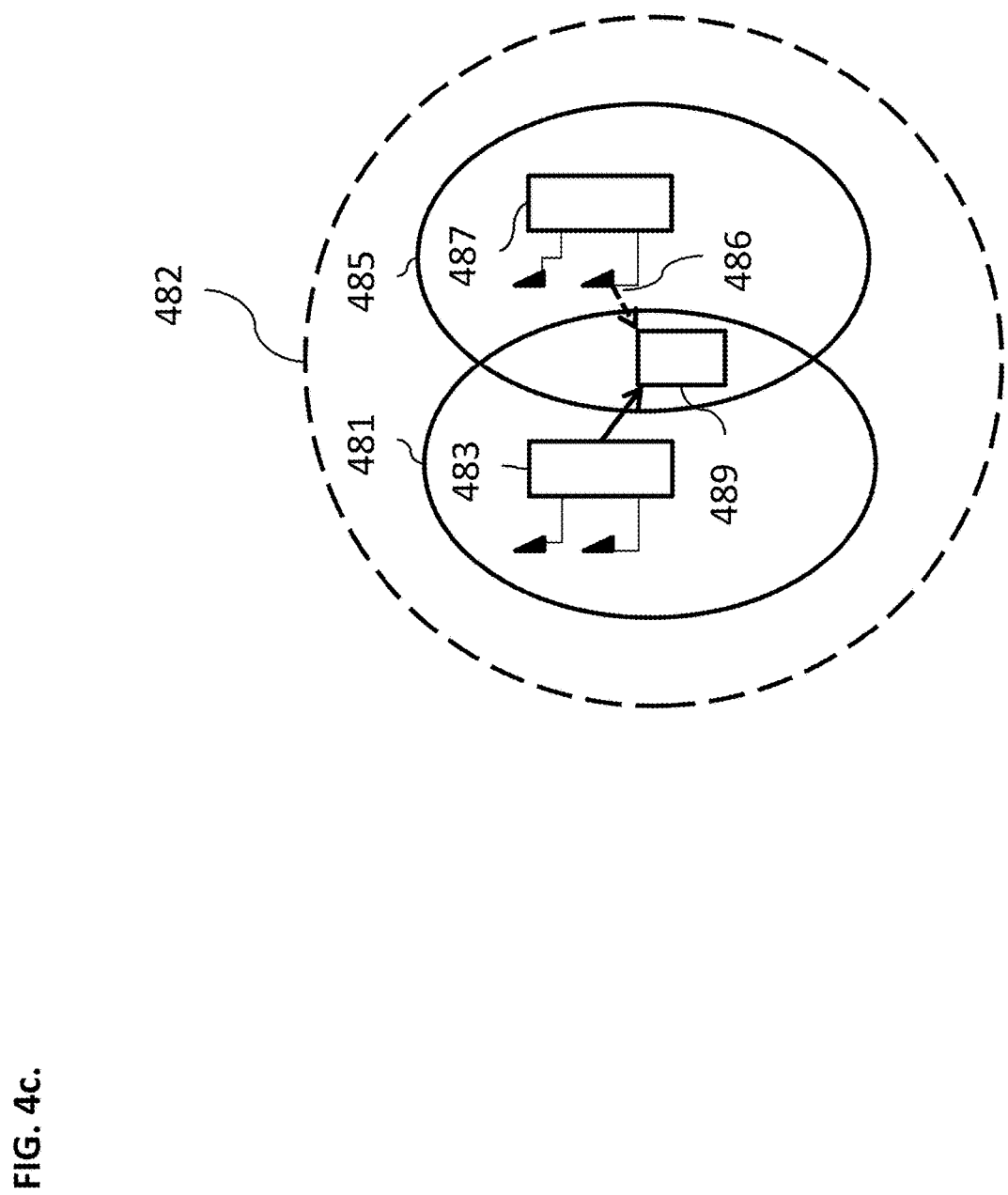

In some implementations, the current subject matter system can be configured to implement 4G LTE-Advanced features, including coordinated multipoint transmission ("CoMP") feature. FIGS. 4b-c illustrate exemplary known dynamic point selection ("DPS") (FIG. 4b) and coordinated scheduling/beamforming ("CS/CB") (FIG. 4c) schemes that can be implemented as part of the CoMP feature. The DPS scheme can refer to a scheme where the transmission point is varied according to changes in channel and interference conditions. The CS/CB scheme can allow coordination of scheduling decisions of neighboring points to reduce interference. These schemes can include point blanking/muting, i.e., whereby one or more transmission points can be turned off in order to decrease interference. These schemes can reduce interference and improve the LTE cell-edge performance. Further, in some implementations, using these schemes, the user equipment can be scheduled to receive data from two points while a third point is muted and/or the user equipment can be scheduled to receive data only from one point where the other one or more points coordinate scheduling and/or are muted to reduce interference.

FIG. 4b illustrates an exemplary implementation of the DPS scheme. According to this scheme, a user equipment 479 can be located within a coordination area 472 of two points 473 and 477, where each has cell areas 471 and 475, respectively. The user equipment 479 can be served by one of the points 473, 477 having better channel conditions. FIG. 4c illustrates an exemplary implementation of the CS/CB scheme. According to this scheme, a user equipment 489 can be located within a coordination area 482 of two points 483 and 487, where each has cell areas 481 and 485, respectively. In this scheme, beam forming and scheduling for the user equipment can be coordinated by the network to avoid interference 486 that can be generated by one of the points (e.g., point 487 as shown in FIG. 4c).

In some implementations, the operation of the current subject matter system using dynamic point selection scheme can be as follows. The user equipment can connect to a serving cell using an RRC connection setup and configured for transmission (e.g., TM10 transmission mode). Once the connection is setup, the uplink connection can remain on the serving cell and can change with the handover procedure. RRC can configure initial downlink transmission points ("TP") based on known reference signal received power ("RSRP") and reference signal received quality ("RSRQ") measurements, which refer to parameters of a strength/quality of a reference signal ("RS") of a cell as determined by a user equipment when it moves from cell to cell and performs cell selection/reselection and handover. The RRC can then configure channel state information reference signal ("CSI-RS") process per transmission point for channel state information ("CSI") reporting, including precoding matrix for physical downlink shared channel ("PMI"), which can be referred to as a measurement set. Then, the RRC can configure enhanced physical downlink control channel ("ePDCCH") per transmission point, which can be referred as a cooperation set. Then, each CoMP transmission point can perform its own scheduling and send an allocation over ePDCCH, thereby providing resource and link adaptation information. The current transmission point serving the user equipment can decode physical uplink control channel information sent by user equipment to the serving cell to extract HARQ and CSI feedback information. Based on that information, the current transmission point can determine the resource allocation for the user equipment. The iBBU can preposition data at all transmission points in the cooperation set for fast switching of CoMP transmission points. Then, only the RLC context can be transferred from a previous transmission point to the current transmission point during transmission point switching. Based on the CSI feedback, the current transmission can inform RRC/RRM components in the iBBU to allow these components to make decisions on transmission point switching and transmission point addition/dropping from the cooperation and measurement sets as well as serving cell change (e.g., during handover). Further, the RRC/RRM components can then select an active transmission point based on a load level of each transmission point in the cooperation set as well as based on the CSI.

In some implementations, the operation of the current subject matter system using the coordinated scheduling/beamforming scheme can be as follows. At lower loads, fractional frequency reuse ("FFR") mechanism can be activated to provide a blanking mechanism and/or to lower the power of physical resource blocks ("PRBs") in scheduling coordination with the serving transmission point (as discussed in 3GGP standards for 4G LTE, and in particular its Release 8 discussing a dynamic inter-cell interference coordination ("ICIC")). For time division duplex ("TDD") and at high traffic loads, the uplink sounding reference signal CUL SRS") in the user equipment can be configured and the transmission points in the cooperation set can be informed to measure channel state information of the user equipment. Coordinated beam forming can be achieved using semi-static time and spatial domain coordination between the transmission points in the cooperation set. For frequency division duplex ("FDD") and at high traffic loads, the PMI feedback for each CSI-RS process can be configured. In this case, the PUCCH can be decoded at each transmission point for channel state information reported by the user equipment. Here, the coordinated beam forming can be also achieved using semi-static time and spatial domain coordination between the transmission points in the cooperation set and based on channel state information reports at each transmission point.

In some implementations, in a single scheduler implementation, it is possible that no transmission gap can be present when the transmission point is switched. In some exemplary, non-limiting implementations, in a distributed scheduling solution, the inter-iRRH one-way latency may be less than 200 ms, which can allow for transmission point switching with a gap of two transmission time intervals ("TTI"). Other values one-way latencies are possible and may or may not be noticeable.

IV. Call Flow Procedures in Intelligent LTE RAN

Figure 5A:
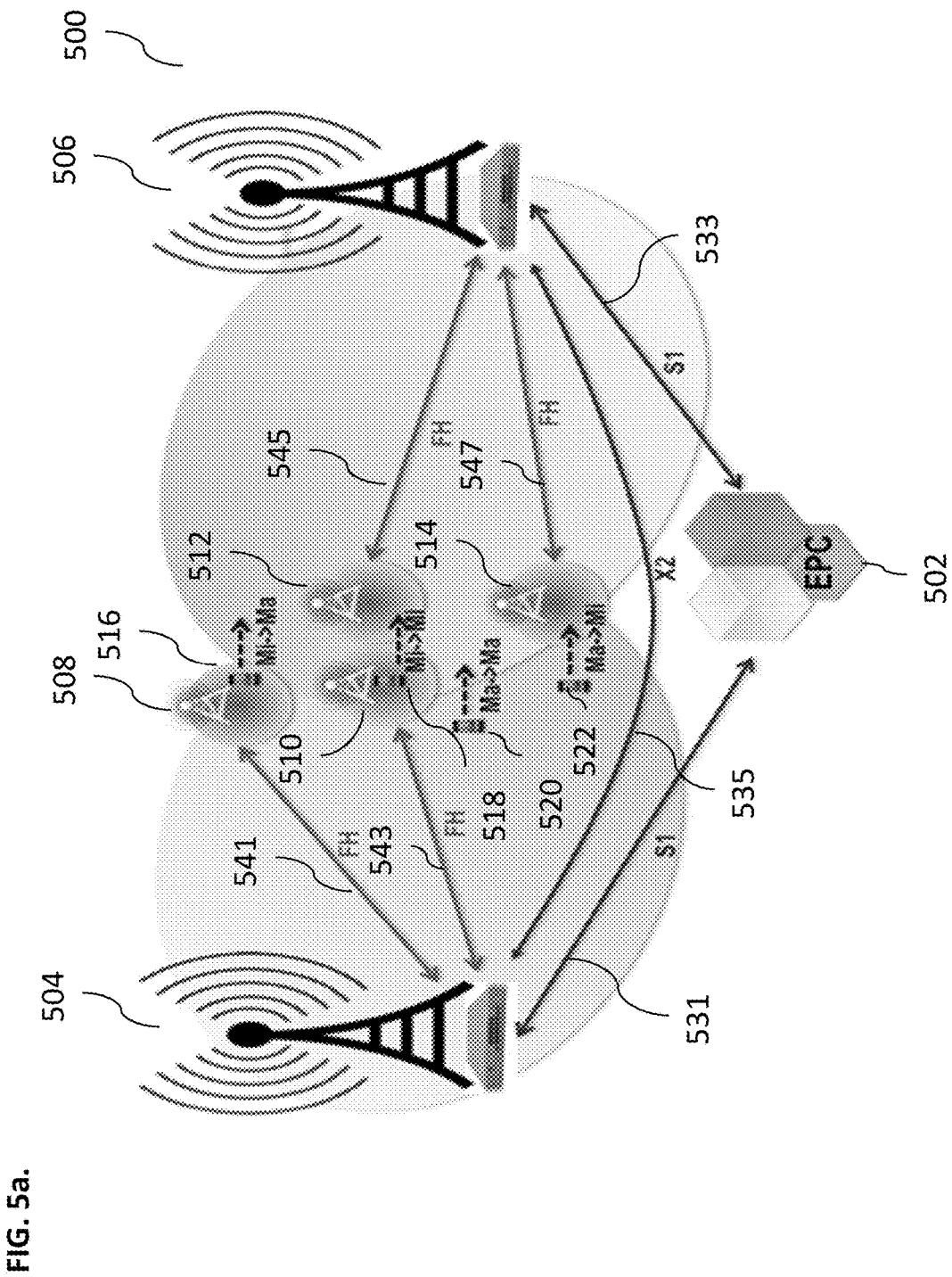
FIGS. 5a-d illustrate exemplary inter-eNodeB handover procedures, according to some implementations of the current subject matter.
Figure 5B:
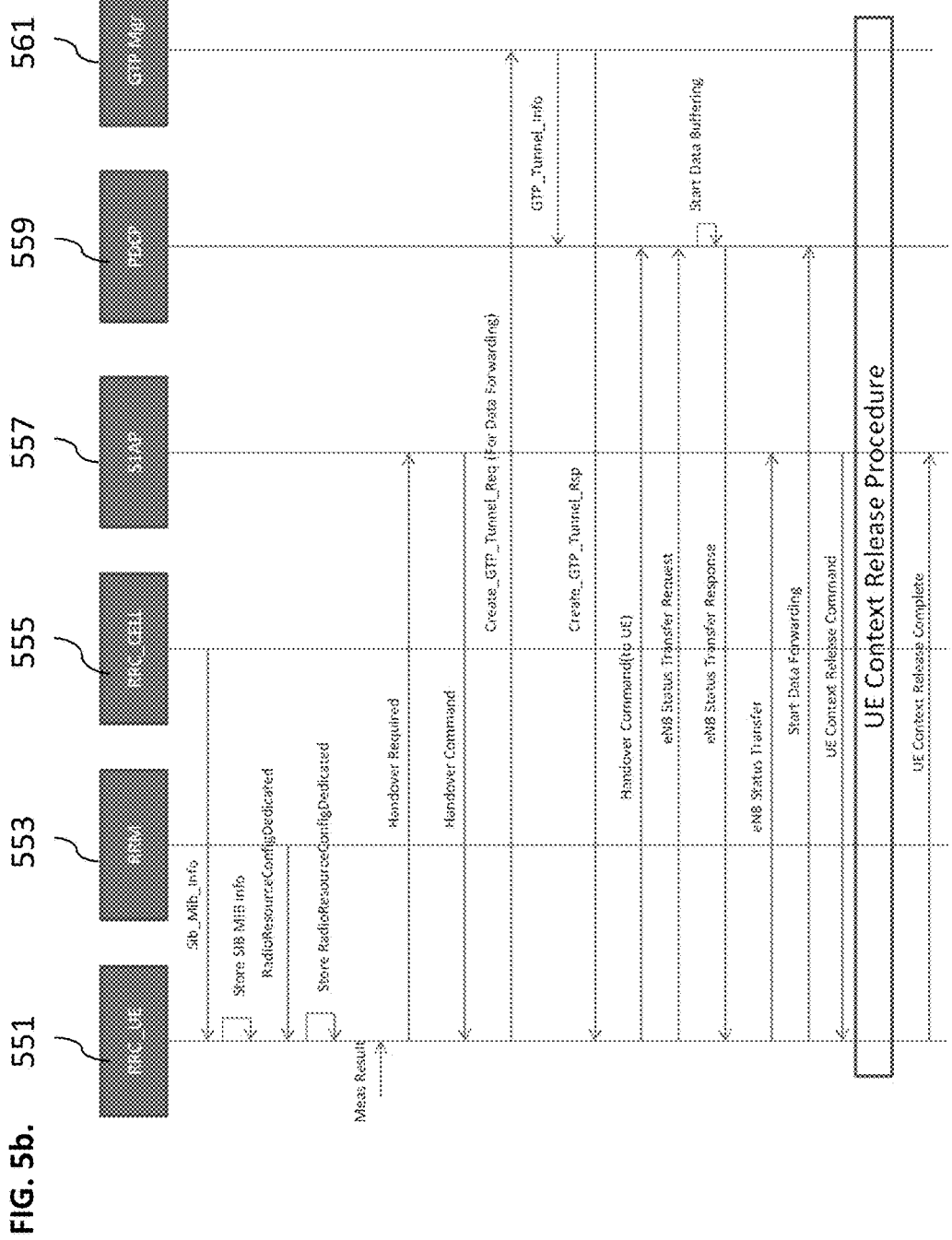
Figure 5C:
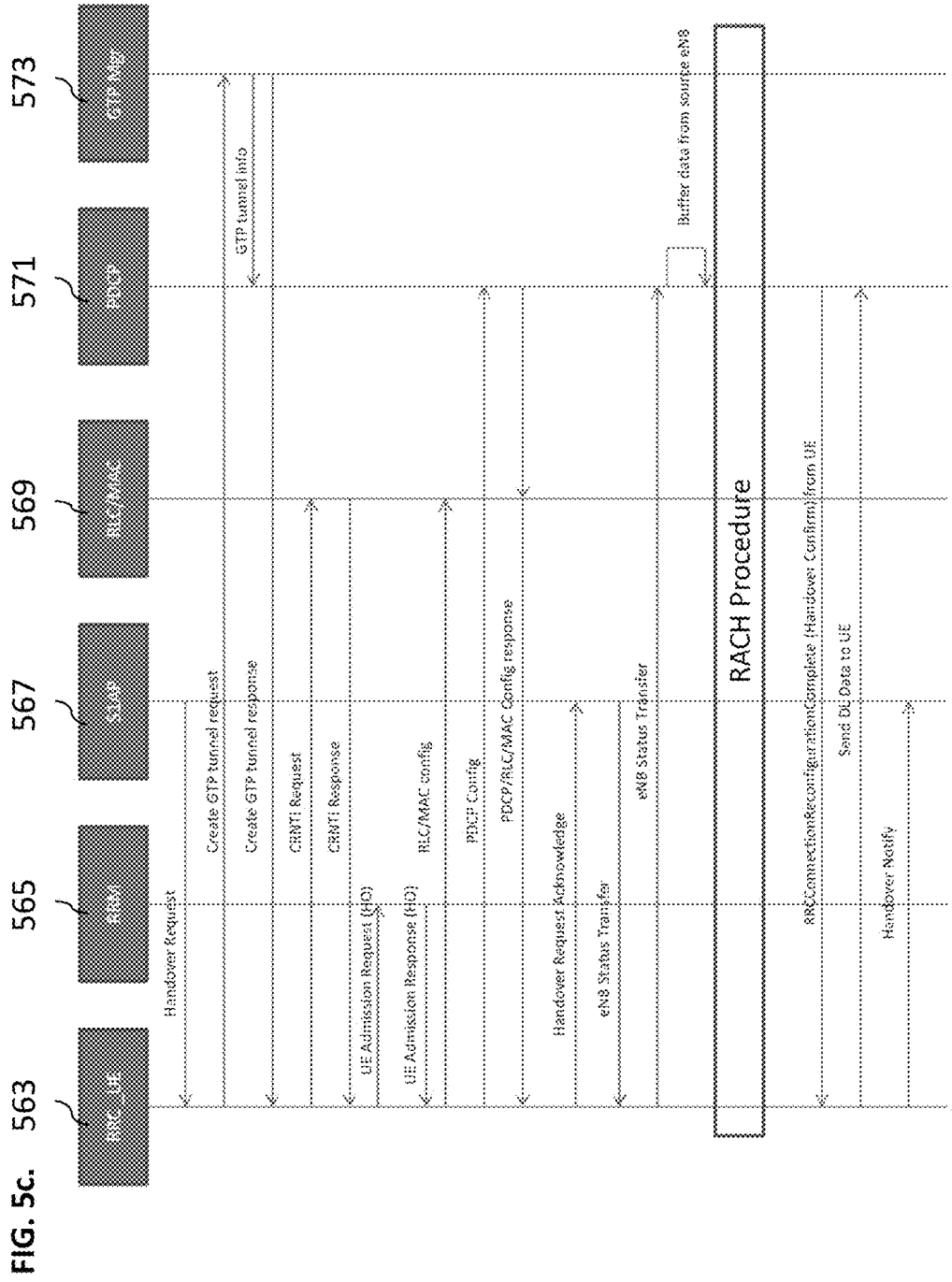
Figure 5D:
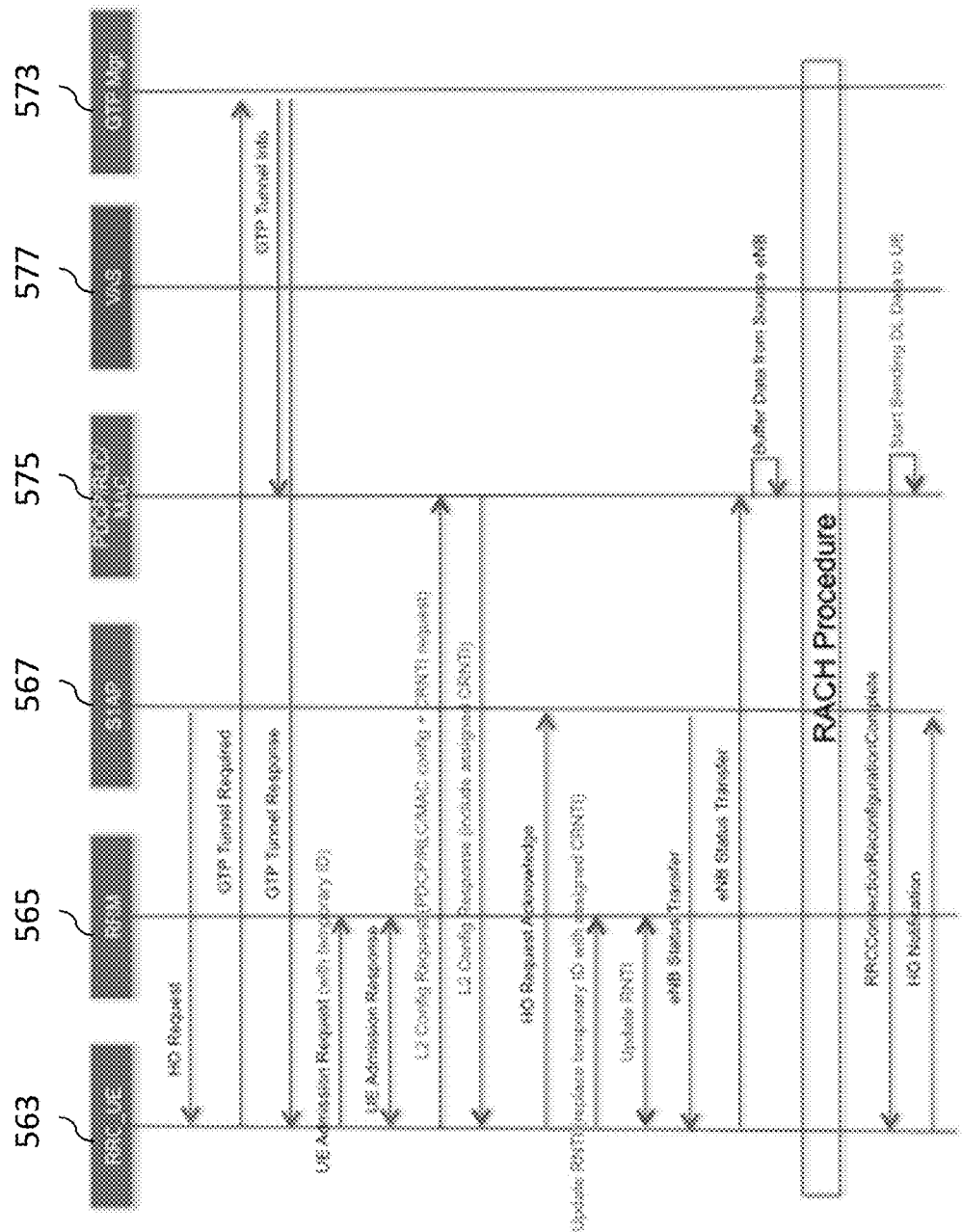
Figure 6A:
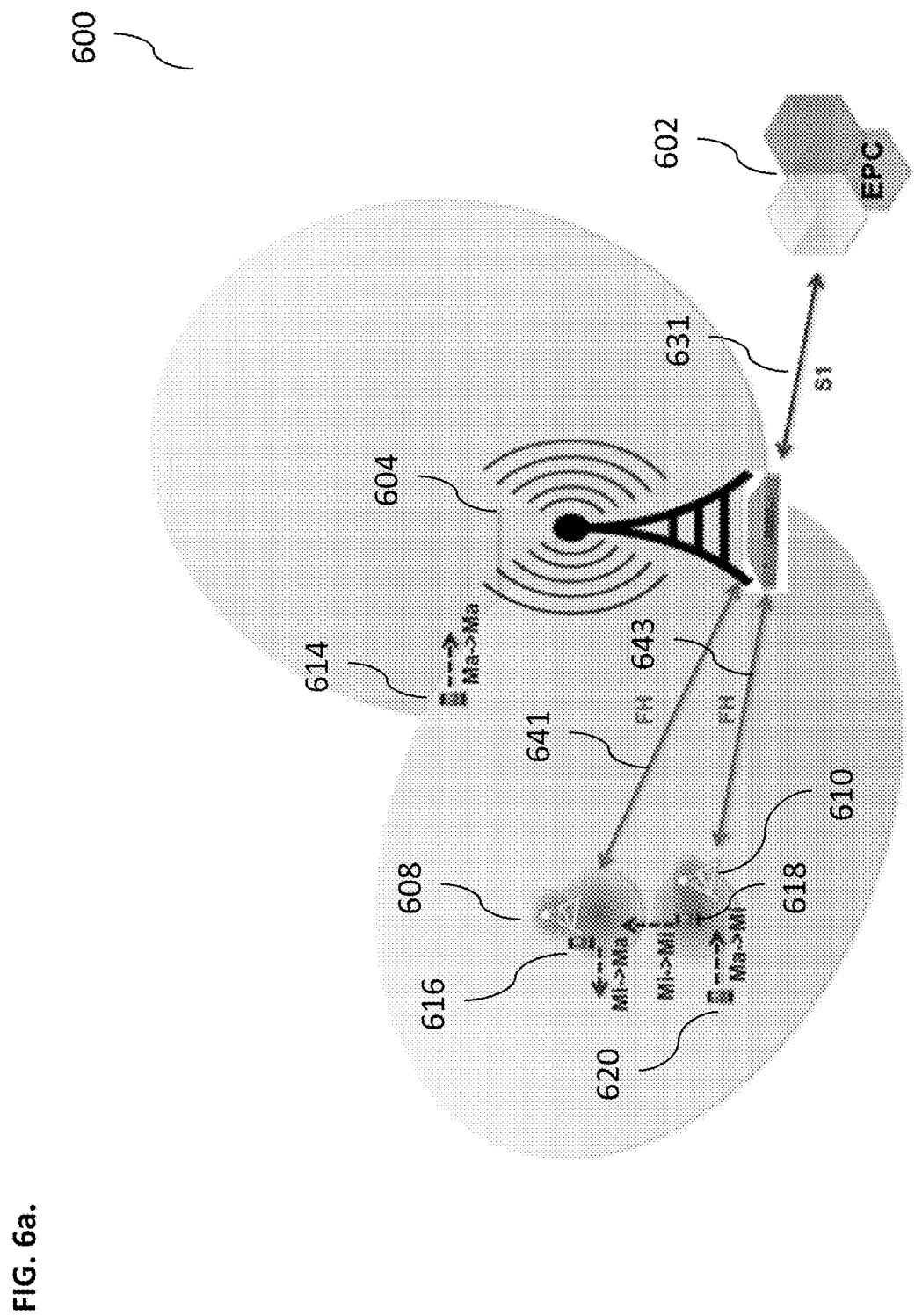
FIGS. 6a-c illustrate exemplary intra-eNodeB handover procedures, according to some implementations of the current subject matter.
Figure 6B:
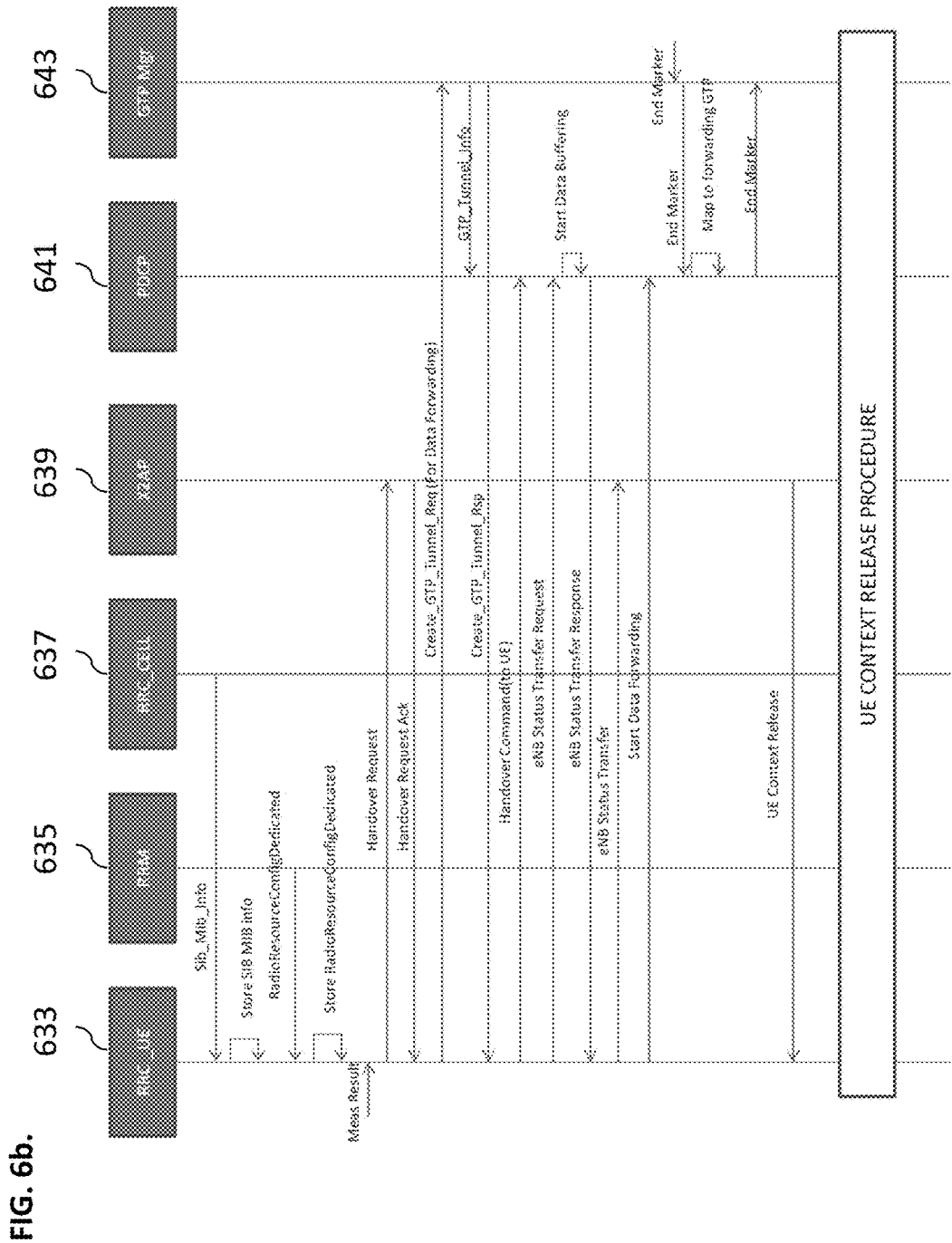
Figure 6C:
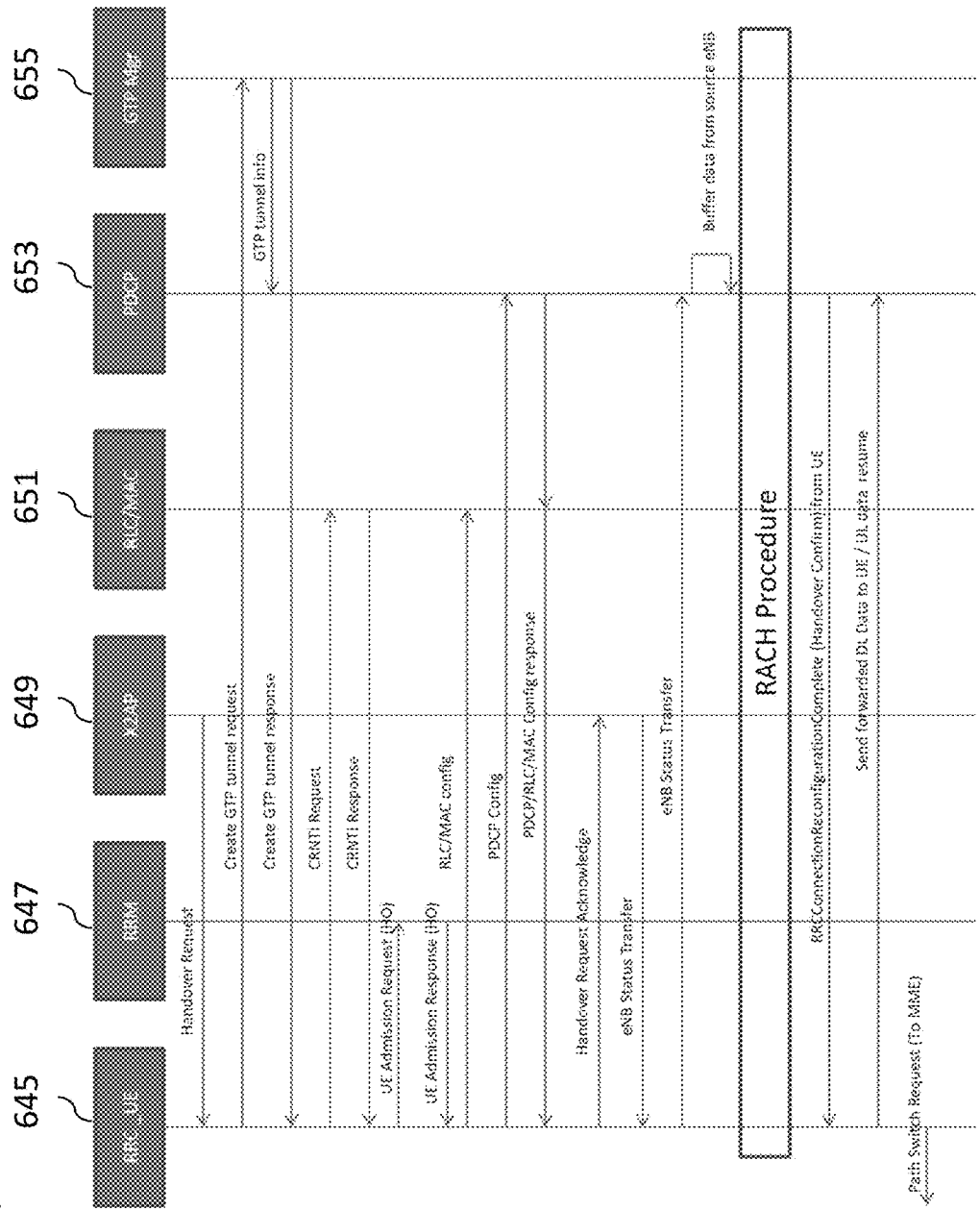

The following description along with FIGS. 5a-8d provide a discussion of exemplary call flow procedures using the current subject matter system, including the RRC procedures, such as, an inter-eNodeB handover procedure (as shown in FIGS. 5a-5d), an intra-eNodeB handover procedure (as shown in FIGS. 6a-6c), an RRC connection establishment procedure (as shown in FIGS. 7a-7h), and an RRC connection re-establishment procedure (as shown in FIGS. 8a-8d). It should be noted that the procedures shown in FIGS. 5a-8d are provided for exemplary, non-limiting and/or illustrative purposes. It is not intended that the current subject matter system be limited to the shown call flow procedures. Other procedures and/or variations of the illustrated procedures can be used by the current subject matter system.

In some implementations, to optimize RRC procedures for a call flow, one or more of the following optimization techniques can be used:
- combining of multiple sequential Layer 1 and/or Layer 2 configuration messages into one;
- piggybacking of RRC messages with Layer 1 and/or Layer 2 configuration messages, if possible;
- providing iRRH with intelligence to allow iRRH to determine when to start sending user plane data when it receives UL RRC acknowledgement messages; and/or
- redistributing Layer 2 functionalities between the iBBU and iRRH to achieve the best possible performance.

In some implementations, using the above procedures, the current subject matter system can significantly reduce latency associated with communications in the LTE systems.

A. Handover Procedures in the Control Plane

1. Inter-eNodeB Handover Procedures

FIGS. 5a-5d illustrate an exemplary inter-eNodeB handover procedures in the control plane, according to some implementations of the current subject matter. FIG. 5a illustrates an exemplary system 500 that can include an iBBU 504 and an iBBU 506 that can communicate with an evolved packet core ("EPC") 502 using S1 connections 531, 533, respectively. The iBBUs 504 and 506 can communicate with one another using an X2 connection 535. One of the iBBUs 504, 506 can be a source (i.e., from where a communication can originate) and the other can be a target (i.e., a recipient of the communication). The system 500 can also include a plurality of iRRHs 508, 510, 512, and 514. As discussed above, the iRRHs can be connected with to their respective iBBUs via fronthaul ("FH") connections. For example the iRRH 508 can be connected to the iBBU 504 via FH connection 541; the iRRH 510 can be connected to the iBBU 504 via FH connection 543, the iRRH 512 can be connected to the iBBU 506 via FH connection 545; and iRRH 514 can be connected to the iBBU 506 via FH connection 547. A plurality of user equipments 516, 518, 520, and 522 can communicate over-the-air with the iRRH 508, 510, 512, and 514, respectively.

In some implementations, the system 500 can allow for various handover scenarios, which can include a macro-to-macro scenario, micro-to-micro scenario, micro-to-macro scenario, and macro-to-micro scenario. In some implementations, in the macro-to-macro scenario, the user equipment 520 can directly communicate with the iBBU 506. In this case, the iBBUs can be centralized, which can cause the X2 interface 535 to have zero latency. In alternate implementations, the macro iRRH can be collocated with the iBBU and thus, the two can be connected using a very low latency FH connection, thereby making an impact on HO performance caused by the FH latency negligible.

The micro-to-micro scenario can involve a communication between two iRRH 510, 512. In this case, both the source and the target cells (i.e., iBBUs 504, 506) can have high-latency FH connections.

The micro-to-macro scenario can involve a communication between user equipment 516 and iBBU 506. In this case, any communications between the user equipment 516 and the source micro cell can involve at least one high-latency FH communication.

The macro-to-micro scenario can involve communication between user equipment 522 and iRRH 514. In this case, any communications between the user equipment 522 and the target micro cell can involve at least one high-latency FH communication.

FIG. 5*b* illustrates exemplary handover procedures for a source eNodeB, according to some implementations of the current subject matter. The commands or messages exchanged during the handover procedures are between a user equipment RRC 551, a radio resource management module 553 (located at an eNodeB), a eNodeB's RRC module (RRC Cell) 555, an S1 application interface (S1AP (located at eNodeB)) 557, a PDCP layer (located at eNodeB) 559, and GPRS Tunneling Protocol ("GTP") Manager (GTP Mgr (located at eNodeB)) 561.

When looking from the source eNodeB perspective, there can be two messages that traverse a FH connection during the handover which can add to the duration of the procedure: one can be a measurement result ("Meas Result") coming from the user equipment, which can trigger a handover preparation in the target cell and the second can be a handover command ("Handover Command") to the user equipment coming from the source eNodeB to the user equipment to inform the user equipment to switch over to the target cell. These messages can be RRC messages, which cannot be avoided and can delineate the handover control plane latency at the source eNodeB. Between these messages, another message can be exchanged, which can indicate that a handover is required ("Handover Required"). This message can be directed from the source eNodeB to the target eNodeB and can traverse the S1/X2 interface(s) with an equivalent of two links, one for each eNodeB. Additionally, a handover command (to user equipment) ("Handover Command (to UE)") message can be originated from the target eNodeB and can also traverse the S1/X2 interface with an equivalent of two links, one for each eNodeB. There are no other layer 1 and/or layer 2 configuration message(s) that traverse the fronthaul connection and prevent sending of the "Handover Command (to UE)" message. The "eNB Status Transfer Request," "eNB Transfer Response" and "eNB Status Transfer" messages are exchanged with the RRC-UE 55 to provide the source eNodeB status. Once that information is provided, a known "UE Context Release Procedure" can be initiated with "UE Context Release Command" and can be completed with "UE Context Release Complete" messages.

If the source eNodeB is a macro cell and its iRRH is co-located with the iBBU, then the Meas Result and Handover Command (to UE) messages can go over a very low latency the FH connection, thereby making the impact of transmission of these messages negligible. The Handover Required message going over the S1/X2 interface might not add more latency to the handover procedure when compared to the handover procedure based on the distributed deployment of the eNodeB.

However, if the iBBU of the source and the target eNodeB are collocated at a central office ("CO"), then the FH connection latency can affect the connection, with the latency on the S1 or X2 interface being insignificant. Thus, the FH latency can be more than offset by the zero latency on the S1/X2. A reduction equivalent to two links can be achieved.

FIG. 5*c* illustrates exemplary handover procedures for a target eNodeB, according to some implementations of the current subject matter. The commands or messages exchanged during the handover procedures are between a user equipment RRC 563, a radio resource management module 565 (located at the target eNodeB), S1 application interface (S1AP (located at the target eNodeB)) 567, radio link control/MAC layer (located at the target eNodeB) 569, a PDCP layer (located at the target eNodeB) 571, and GTP Manager (GTP Mgr (located at eNodeB)) 573.

On the target eNodeB, after receiving a handover request from a source eNodeB, the current call flow can have three pairs of request/response messages traversing the fronthaul before the handover request acknowledge message is sent back to the source eNodeB. These messages can include: "CRNTI Request/CRNTI Response," "RLC/MAC Config/RLC/MAC Config response", and "PDCP Config/PDCP Config Response," which can be layer 1 and/or layer 2 configuration messages. This part of the call flow can be considered as the handover preparation phase. Similar to FIG. 5*b*, target eNodeB status transfer information messages can be exchanged with the RRC-UE 563 and subsequent to the exchange of this information, a known random access channel ("RACH") procedure can be performed. In some implementations, these pairs of three layer 1 and/or layer 2 configuration messages can be combined into one layer 2 "Config Request"/"L2 Config Response" pair. Thus, only two messages would have to traverse the fronthaul during this handover preparation phase.

Once the user equipment has switched over to the target eNodeB, two additional messages can traverse the fronthaul before the target eNodeB starts sending data to the user equipment. These can include: "RRCConnectionReconfigurationComplete" and "Send DL Data to UE." These can also be optimized by giving the PDCP entity in the iRRH an intelligence to know when the "RRCConnectionReconfigurationComplete" is received and start sending data without being instructed by the RRC component. In some implementations, both messages can be eliminated from gating the start of data transfer.

FIG. 5*d* illustrates an exemplary optimized call flow for the S1-based handover in the target eNodeB, according to some implementations of the current subject matter. FIG. 5*d* is similar to FIG. 5*c* and includes some of the same components which are used to exchange commands or messages (i.e., the user equipment RRC 563, a radio resource management module 565, S1AP 567, and GTP Manager 573). However, as shown in FIG. 5*d*, the radio link control/MAC layer and a PDCP layer have been combined into a single component 575 and a VAS component 577 has been added.

Similar to the handover procedures discussed in connection with the source eNodeB (as shown in FIG. 5*b*), if the target eNodeB is a macro cell and its iRRH is co-located with the iBBU, then there can be no penalty on the handover procedure due to the low latency fronthaul. In some exemplary implementations, varying degrees of latency on the fronthaul can affect inter eNodeB handover performance.

2. Intra-eNodeB Handover

FIGS. 6*a*-6*d* illustrate an exemplary intra-eNodeB handover procedures in the control plane, according to some implementations of the current subject matter. FIG. 6*a* illustrates an exemplary system 600 that can include an iBBU 604 that can communicate with an evolved packet core ("EPC") 602 using an S1 connection 631. The system 600 can also include iRRHs 608 and 610. As discussed above, the iRRHs 608, 610 can be connected with to the iBBU 604 via fronthaul ("FH") connections. For example, the iRRH 608 can be connected to the iBBU 604 via FH connection 641; the iRRH 610 can be connected to the iBBU 604 via FH connection 643. A plurality of user equipments 616, 618, 620, and 622 can communicate over-the-air with the iRRH 608 and 610.

In some implementations, the system 600 can allow for various handover scenarios, which can include a macro-to-macro scenario, micro-to-micro scenario, micro-to-macro scenario, and macro-to-micro scenario. In some implementations, in the macro-to-macro scenario, the iBBU 604 can be centralized (having higher latency on the fronthaul) or a macro iRRH can be collocated with the iBBU 604 (having a low latency on the fronthaul). In this scenario, an impact to handover performance caused by the fronthaul latency can be negligible.

In the micro-to-micro scenario, both source and target cells can have high latency fronthaul connections. In this case, any handovers involving a micro cell can involve an inter-eNodeB handover with inter-eNodeB control messages traversing the S1 or X2 links with an associated latency impact.

In the micro-to-macro scenario, any communications between user equipment and a source micro cell can involve at least one high latency fronthaul link. Similar to the micro-to-micro scenario, latency can impact any inter-eNodeB handover that can involve inter-eNodeB control messages traversing S1 or X2 links.

In the macro-to-micro scenario, any communications between user equipment and the target micro cell can involve at least one high latency fronthaul link. This scenario is also similar to the micro-to-micro and micro-to-macro scenarios.

In some implementations, the intra-eNodeB handover can be similar to X2 (inter-eNodeB) handover. In this case, as shown in FIG. 6b, an X2AP module 639 can route messages meant for cells belonging to the same eNodeB. Thus, no delay is incurred in connection with the internal X2 interface. FIGS. 6b-c illustrate exemplary call flows for the X2-based handover procedures in the source and the target eNodeB, respectively.

FIG. 6b illustrates exemplary X2-based handover procedures for a source eNodeB, according to some implementations of the current subject matter. The commands or messages exchanged during the handover procedures are between a user equipment RRC 633, a radio resource management module 635 (located at an eNodeB), a eNodeB's RRC module (RRC Cell) 637, an X2 application interface (X2AP (located at eNodeB)) 639, a PDCP layer (located at eNodeB) 641, and GTP Manager (GTP Mgr (located at eNodeB)) 643.

In some implementations, the number of messages traversing the fronthaul can similar to the number of messages traversing the fronthaul in the inter-eNodeB handover procedures, as discussed in FIG. 5b above. However, if the source eNodeB is a micro cell, two additional messages—"Handover Request" and "Handover Request Ack" can traverse the S1/X2 interface with similar link latency in the fronthaul, as discussed above. As such, the fronthaul latency can be offset by a zero latency in the intra-eNodeB handover.

If the source eNodeB is a macro cell and its iRRH is co-located with the iBBU, then the "Meas Result" and "Handover Command (to UE)" messages can traverse the fronthaul with a low latency, thereby making the latency impact substantially negligible.

FIG. 6c illustrates exemplary X2-based handover procedures for a target eNodeB, according to some implementations of the current subject matter. The commands or messages exchanged during the handover procedures are between a user equipment RRC 645, a radio resource management module (located at the target eNodeB) 647, X2 application interface (X2AP (located at the target eNodeB)) 649, RLC/MAC layer (located at the target eNodeB) 651, a PDCP layer (located at the target eNodeB) 653, and GTP Manager (GTP Mgr (located at eNodeB)) 655.

The X2-based handover procedures for the target eNodeB can be similar to the S1-based handover procedures for the target eNodeB, as discussed above in connection with FIG. 5c. Additionally, if eNodeB is a micro cell, two additional messages—"Handover Request" and "Handover Request Ack" can traverse the S1/X2 interface with similar link latency, as discussed above. As such, there is no increase in intra-eNodeB handover control plane latency due to the fronthaul in the target eNodeB during the handover preparation.

If the target eNodeB is a macro cell and its iRRH is co-located with the iBBU, then the "L2 Config Request/L2 Config" messages can traverse the fronthaul with a low latency, thereby making the overall latency impact substantially negligible.

B. Handover Procedures in the User Plane

In the user-plane, key performance indicator can include a transmission gap starting at the time the user equipment is informed to switch to a new cell to the time when data can start flowing again. The downlink ("DL") and uplink ("UL") user-plane handover procedures can be different and are discussed in the following sections.

1. Handover Procedures in the User Plane on the Downlink

The DL user-plane performance impact can be based on a number of messages that can traverse the fronthaul thereby gating the start of the downlink data transfer over the air. The downlink user-plane performance can be impacted if the data forwarding procedure takes too long and forces the target eNodeB to wait for data to be available to send while the user equipment has already indicated that it is ready to receive.

FIGS. 5c and 6c illustrate call flow handover procedures during handover execution phase starting when the user equipment has indicated that it has switched over to the target eNodeB using a "RRCConnectionReconfigurationComplete" message. Assuming that the target eNodeB already has data forwarded from the source eNodeB and is ready to send, one additional message "Send DL Data to UE" can be sent to PDCP to start the data transmission to the user equipment. In some implementations, the PDCP component in the iRRH can be pre-configured using a "L2 Config Request" message sent during the preparation phase, discussed above, to automatically start sending downlink data and accepting uplink data as soon as the "RRCConnectionReconfigurationComplete" message with the appropriate C-RNTI identity is detected (as shown in FIG. 5d).

To ensure that the data will be available at the target eNodeB before it needs to be sent, the data forwarding procedure that takes place in the source eNodeB can be optimized. FIGS. 5b and 6b illustrate exemplary forwarding procedures for the S1-based (FIG. 5b) and X2-based (FIG. 6b) handovers. If all PDCP functions are located in the iRRH, then there can be three messages that traverse the fronthaul, which are gating the start of the flowing of the forwarded data: "eNodeB Status Transfer Request," "eNodeB Status Transfer Response" and "Start Data Forwarding" messages. Additionally, data must traverse the fronthaul from layer 2 of the source eNodeB to the centralized unit and then to the layer 2 of the target eNodeB. To optimize this call flow, some PDCP functions, such as compression and SN numbering, can be optimized. Further, PDCP buffers can be co-located in the iBBU along with layer 3 and GTP functions. This optimization can eliminate sending of "Start Data Forwarding" message all the way to PDCP, which can terminate locally. The "Status Transfer Request/Response" messages can be also terminated locally in the iBBU.

2. Handover Procedures in the User Plane on the Uplink

The uplink user-plane performance can be affected by the fronthaul latency, through which the traffic must traverse before being forwarded to the EPC over the backhaul link. If the iBBU is centralized at the CO with the S-GW and P-GW, then the S1 latency can be substantially zero. Thus, the increase in latency introduced by the fronthaul can be offset by the reduction in latency from S1. The 3GPP Standards can also allow for the buffered UL PDCP SDU received out of sequence in the source eNodeB to be forwarded to the target eNodeB. Even though the buffered data to be forwarded does not gate the first few packets of data sent toward the EPC in the UL, it is important that the data forwarding is carried out in a timely manner to avoid data flow from being interrupted with subsequent packets.

In some implementations, to optimize handover procedures in the user plane on the uplink, some PDCP functions, e.g. compression and SN numbering, and PDCP buffers can be co-located in the iBBU along with the layer 3 and GTP functions. This can eliminate the need to forward the UL PDCP SDU all the way from the source iRRH to the target iRRH. Instead, the data can be forwarded from the PDCP buffers in the iBBU. In some exemplary implementations, impact on the uplink user-plane handover performance due to fronthaul latency can be similar to the one for the downlink.

C. RRC Connection Establishment Procedure

FIGS. 7a-h illustrate details associated with an exemplary RRC connection establishment procedure. In some implementations, this procedure can transition a user equipment from an idle state to an active state and can include the following exchange of commands/messages: "RACH Access", "RRC Connection Establishment Request", "S1 Setup", "Initial Security Activation", "UE Capability Transfer", and "RRC Connection Reconfiguration" to start the downlink data flow from the EPC. In some implementations, the RACH Access procedure can be handled by layer 2 and thus might not involve any messages traversing the fronthaul. In some implementations, where the iBBU's are centralized at the CO along with the EPC, the S1 interface latency can be assumed to be zero and thus can compensate for some increase in latency due to the front haul.

Figure 7A:
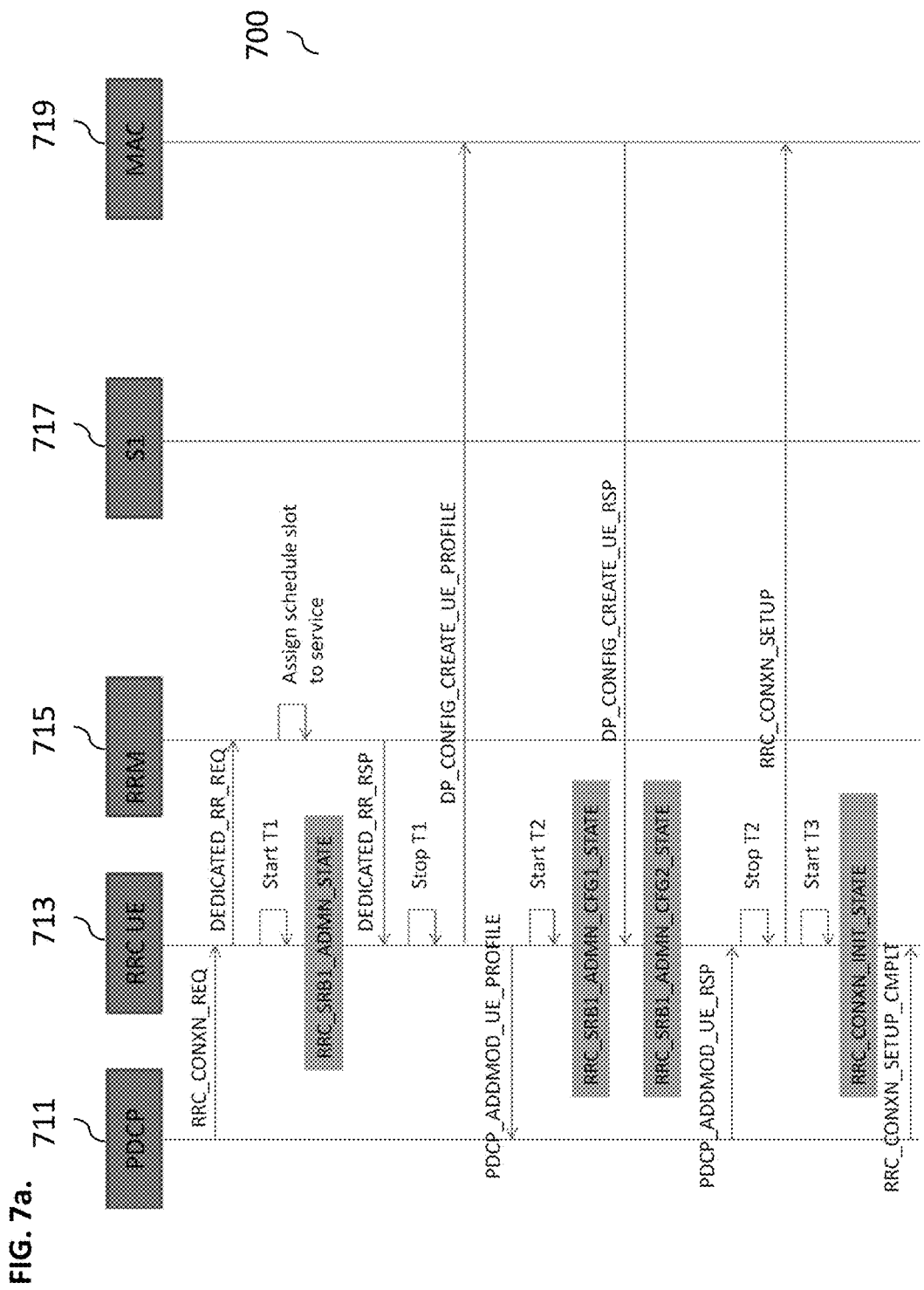
FIGS. 7a-h illustrate exemplary RRC connection establishment procedures, according to some implementations of the current subject matter.

FIG. 7a illustrates an exemplary RRC connection establishment procedure 700, according to some implementations of the current subject matter. The procedure 700 can involve exchanging or traversing of commands/messages between PDCP component 711, RRC user equipment 713, RRM 715, S1 interface 717 and MAC layer 719.

As shown in FIG. 7a, the procedure 700 can be initiated by sending a "RRC-CONXN_REQ" message and completed by sending a "RRC_CONXN_SETUP_CMPLT" message from PDPC 711 to RRC user equipment 713. Between these two messages, five additional messages can traverse the fronthaul and thus, contribute to the procedure duration time. These messages can include a pair of PDCP configuration messages—"PDCP_ADDMOD_UE_PROFILE/RSP"; a pair of MAC configuration messages— "DP_CONFIG_CREATE_UE_PROFILE/RSP"; and another RRC message—"RRC_CONXN_SETUP". In some implementations, PDCP and MAC messages can be carried out in parallel and/or can be combined into a single layer 2 Config/Rsp message.

In some implementations, to further reduce the procedure 700 duration, "RRC_CONXN_SETUP" can be combined with the "L2 Config" message, thereby further reducing number of messages traversing fronthaul by one. The "L2 Config Rsp" message can also be combined with these two message, thereby further reducing number of messages and total duration time for the procedure 700.

Figure 7B:
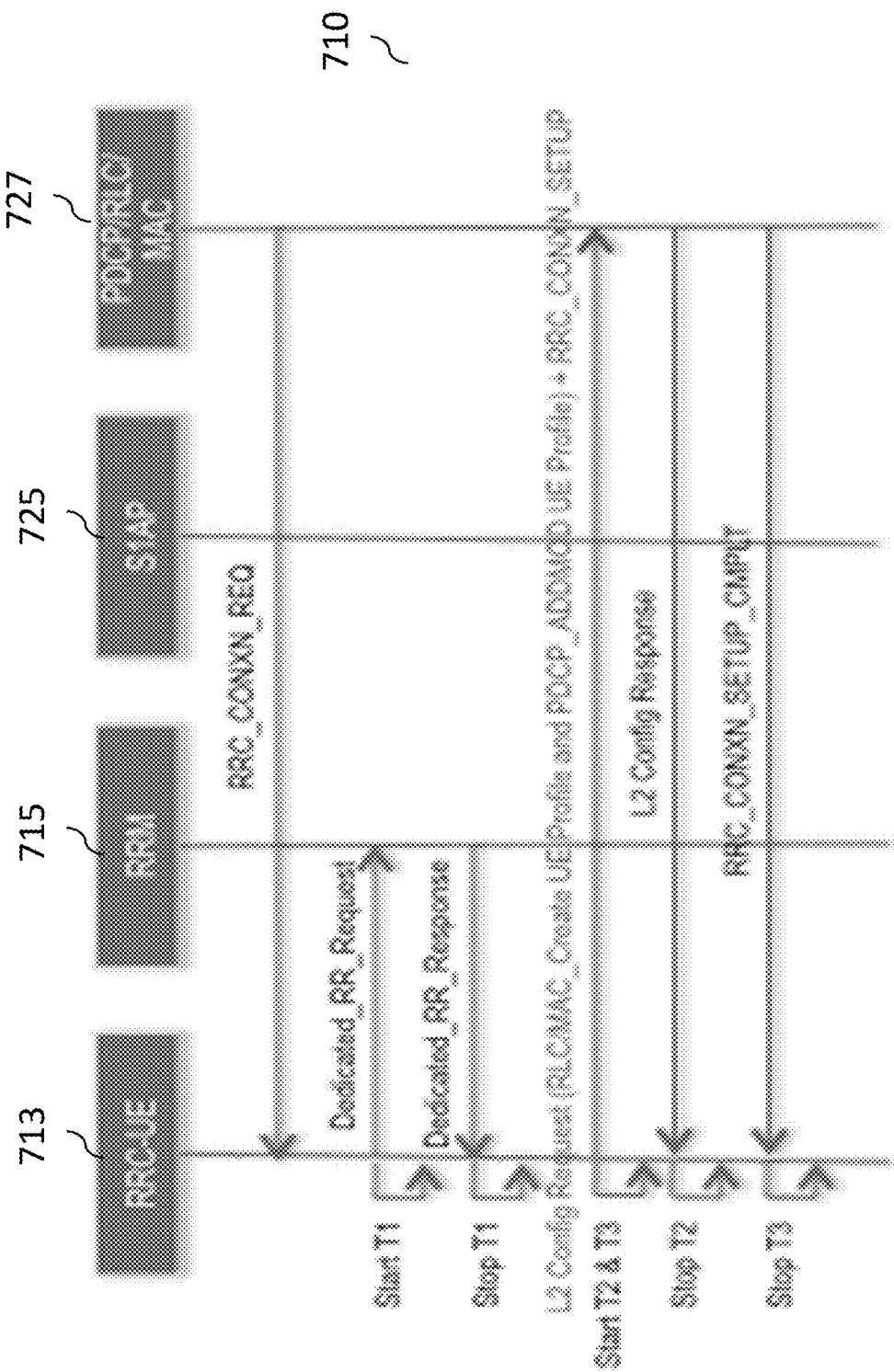

FIG. 7b illustrates an exemplary optimized RRC connection establishment procedure 710 in accordance with the optimization technique discussed above. In particular, the combined messages can now be exchanged between RRC-UE 713, RRM 715, S1AP 725, and PDCP/RLC/MAC 727. As discussed above in connection with FIG. 7a, the procedure begins with sending "RRC_CONXN_REQ" message and completes with sending "RRC_CONXN_SETUP_CMPLT" message from PDPC/RLC/MAC 727 to the RRC at the user equipment 713. The "Dedicated RR Request" and "Dedicated RR Response" messages are exchanged between RRC-UE 713 and RRM 715. Then, the combined message of "L2 Config Request" (which can include "RLC/MAC Create UE Profile" and "PDPC_ADDMOD UE Profile" messages) and RRC_CONXN_SETUP" can be sent from RRC-UE 713 to PDCP/RLC/MAC 727. The "L2 Config Response" message can be sent back to the RRC-UE 713 and followed by the "RRC_CONXN_SETUP_CMPLT" message to complete the RRC connection establishment procedure.

Figure 7C:
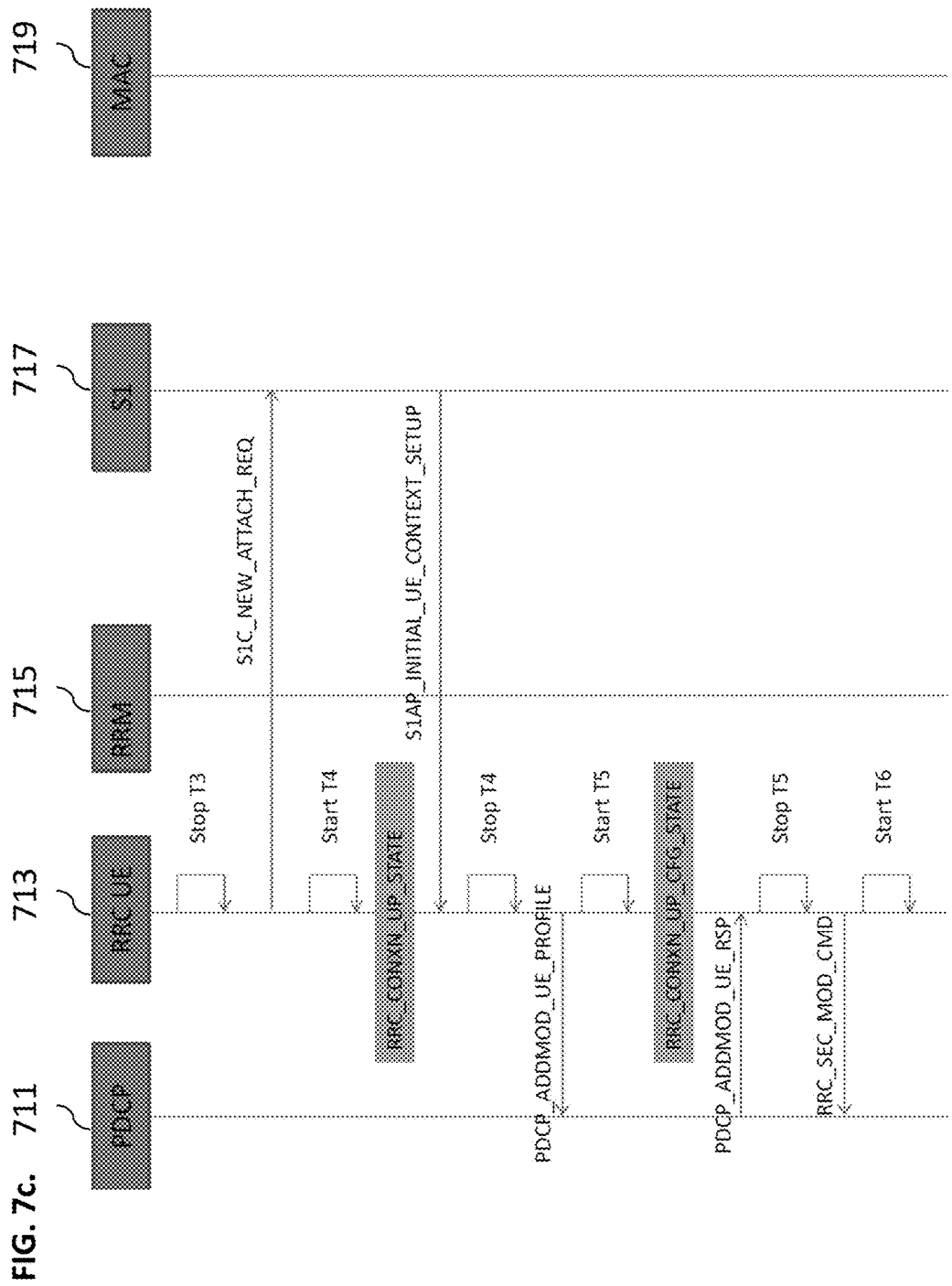
Figure 7D:
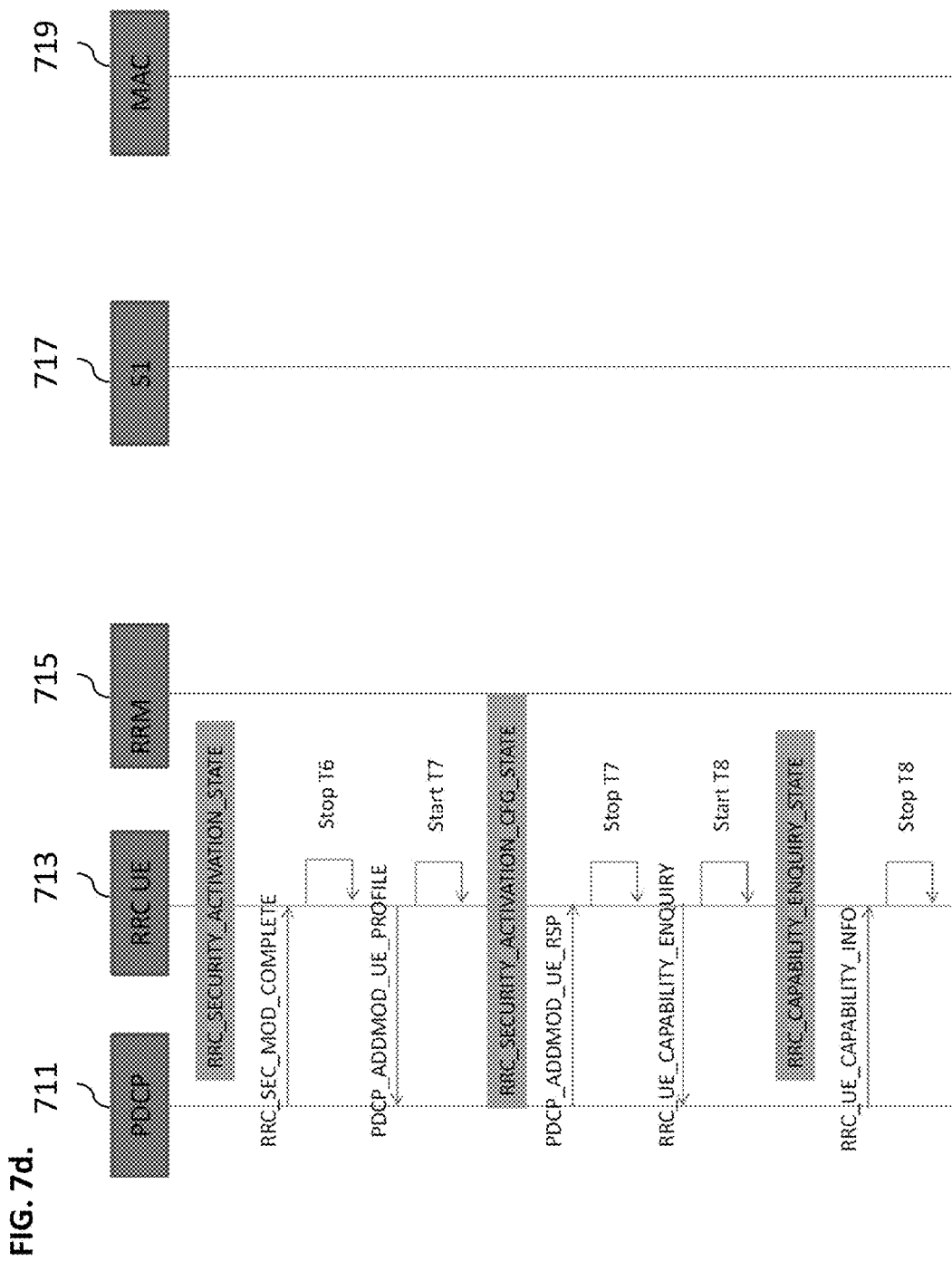

FIG. 7c illustrates an exemplary S1 interface setup procedure, according to some implementations of the current subject matter. The S1 setup procedure can follow the RRC establishment procedure discussed in connection with FIGS. 7a-b above. The S1 setup procedure can include a pair of PDCP configuration messages traversing the fronthaul: "PDCP_ADDMOD_UE_PROFILE" and "PDCP_ADDMOD_UE_RSP" (between PDCP 711 and RRC-UE 713). FIG. 7d illustrates an exemplary initial security activation procedure that can follow the S1 interface setup procedure. This procedure can include an exchange of the following four messages that traverse the fronthaul: a pair of RRC messages ("RRC_SEC_MOD_CMD" and "RRC_SEC_MOD_COMPLETE" (between PDCP 711 and RRC-UE 713)) and a pair of PDCP configuration messages ("PDCP_ADDMOD_UE_PROFILE" and "PDCP_ADDMOD_UE_RSP" (between PDCP 711 and RRC-UE 713)). FIG. 7d also illustrates an exemplary UE capability transfer procedure. This procedure can follow the initial security activation procedure discussed above. It can include a pair of RRC messages ("RRC_UE_CAPABILITY_ENQUIRY" and "RRC_UE_CAPABILITY_INFO" (between PDCP 711 and RRC-UE 713)). Thus, for these three procedures, there can be eight messages that can traverse the fronthaul.

Figure 7E:
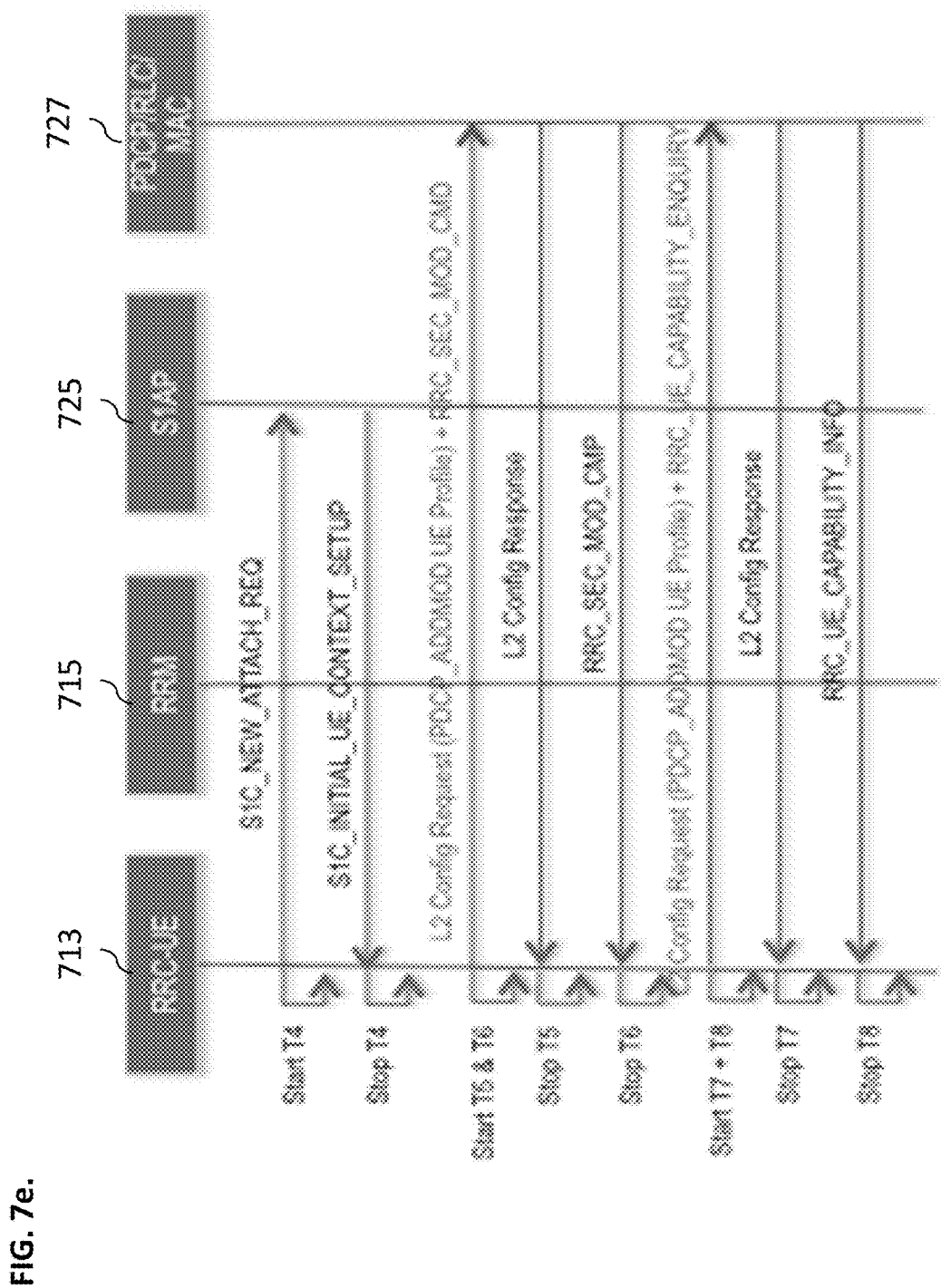

In some implementations, the current subject matter system can optimize these three procedures by combining some of the messages that are exchanged between its components into a single message. FIG. 7e illustrates an exemplary optimization technique that can reduce the number of messages traversing the fronthaul by a half by combining each "L2 Config" message with an RRC message.

As shown in FIG. 7e, the optimized procedure can begin with "S1C_NEW_ATTACH_REQ" AND "S1C_INITIAL_UE_CONTEX_SETUP" messages exchanged between the RRC-UE 713 and S1AP 725. Then, a combination of "L2 Config Request" and "RRC_SEC_MOD_CMD" message can be sent from RRC-UE 713 to the PDCP/RLC/MAC 727, where the "L2 Config Request" can include "PDCP_ADDMOD UE PROFILE" message. A "L2 Config Response" and "RRC_SEC_MOD_CMP" messages can follow from PDCP/RLC/MAC 727. The next L2 Config message can be also a combination of "L2 Config Request" and "RRC_UE_CAPABILITY_ENQUIRY" messages that are sent from the RRC-UE 713 to the PDCP/RLC/MAC 727, where the "L2 Config Request" can include PDCP_ADDMOD UE Profile" message. This combined message can be followed by "L2 Config Response" and "RRC_UE_CAPABILITY_INFO" message, thereby completing the optimized procedure.

In some implementations, where the iBBU's are centralized at the CO along with the EPC, the overall delay impact of the fronthaul can be offset by two S1-AP messages ("SIC_NEW_ATTACH_REQ" and "SIC_INITIAL_UE_CONTEXT_SETUP"), which can have a substantially zero transport delay.

Figure 7F:
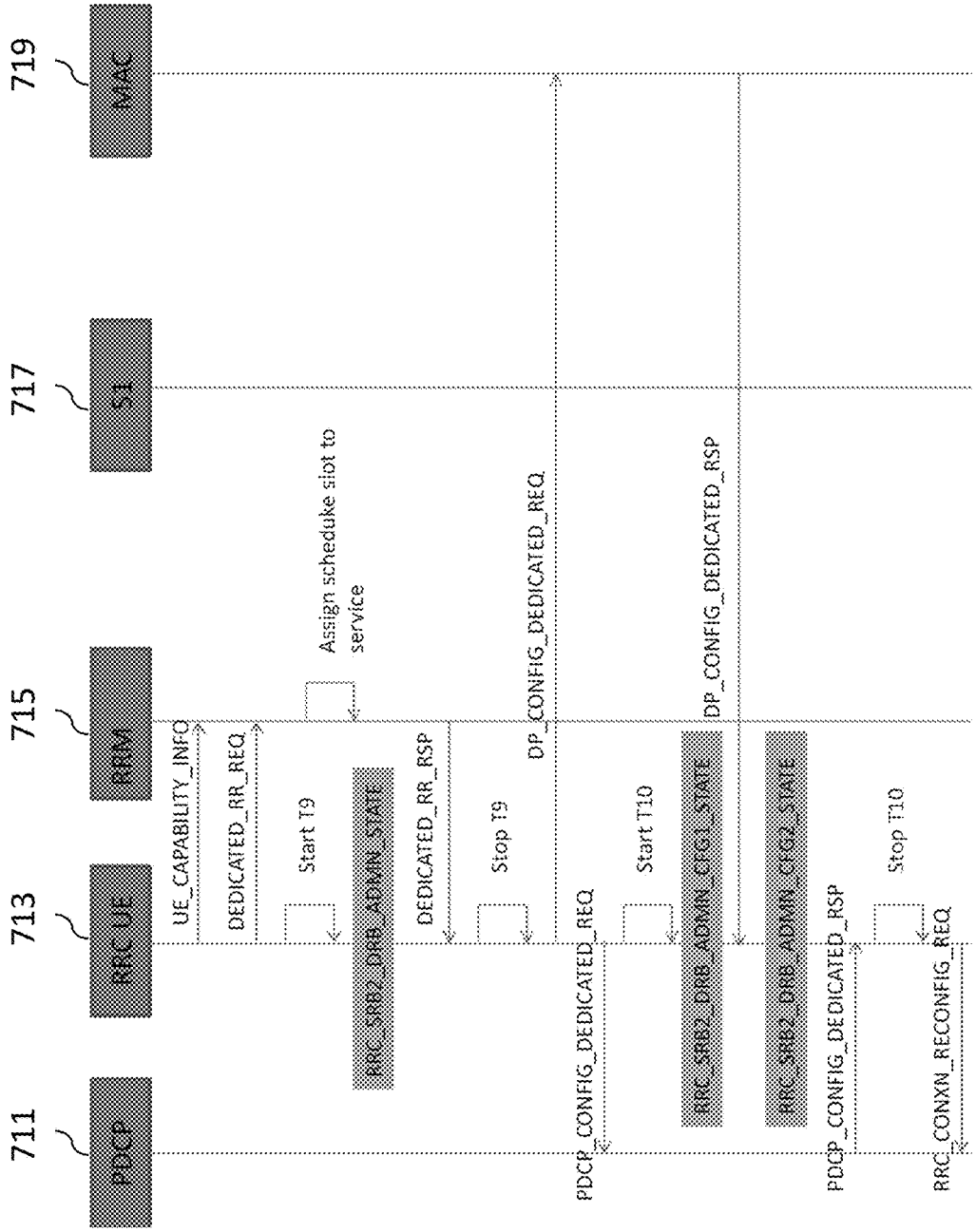
Figure 7G:
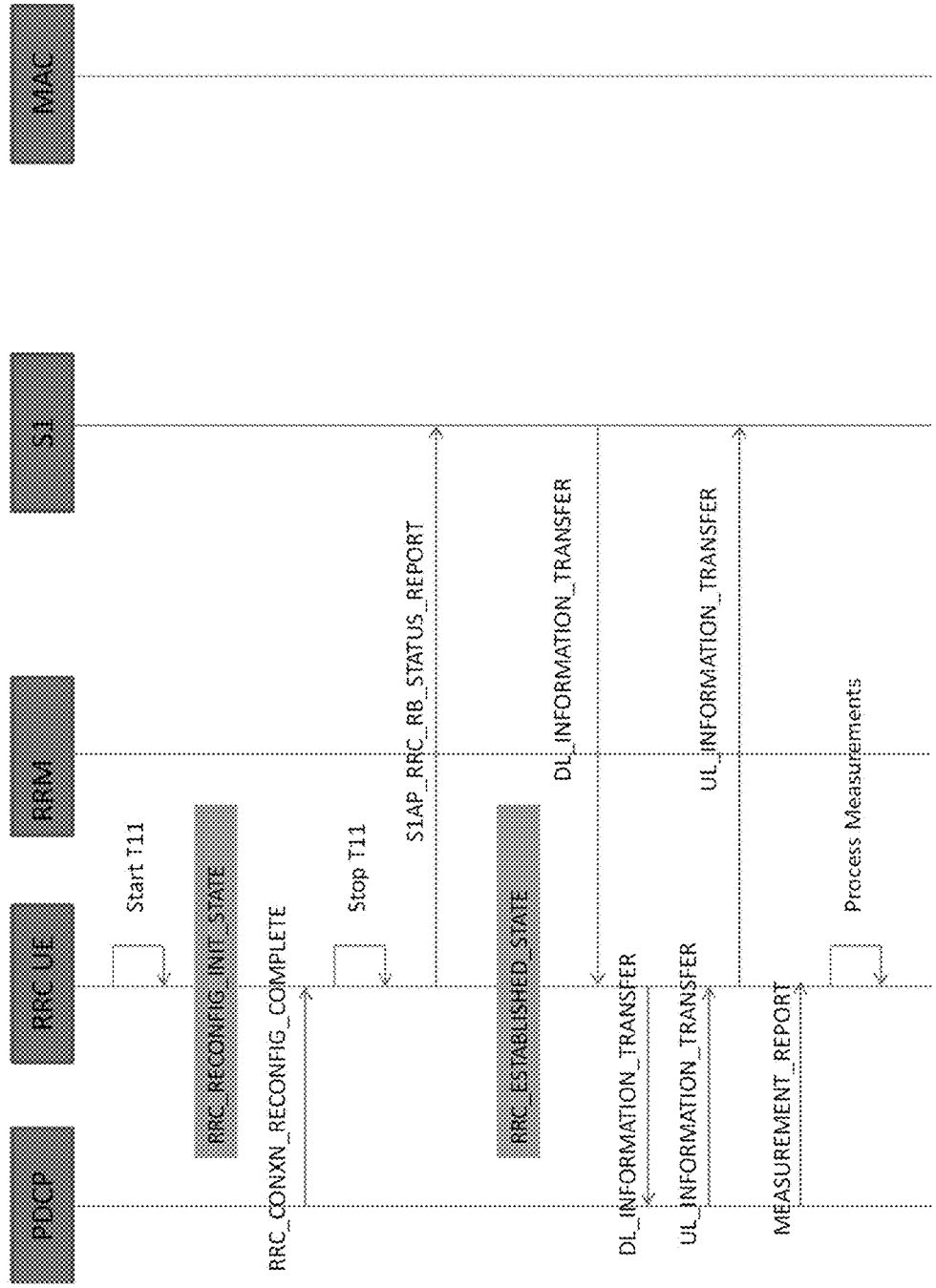

FIGS. 7f-g illustrate exemplary RRC connection reconfiguration and S1 downlink activation procedures, according to some implementations of the current subject matter. These procedures (i.e., exchange of messages that can traverse the fronthaul) can be performed after completion of the S1 setup, initial security activation and UE capability transfer procedures discussed above in connection with FIGS. 7c-e. The RRC connection reconfiguration procedure (shown in FIG. 7c) can be similar to the RRC connection establishment procedure (as shown in FIG. 7a) and can include a pair of PDCP ("PDCP_CONFIG_DEDICATED_REQ" and "PDCP_CONFIG_DEDICATED_RSP") and a pair of MAC ("DP_CONFIG_DEDICATED_REQ" and "DP_CONFIG_DEDICATED_RSP") configuration messages followed by a pair of RRC messages between the eNodeB and the user equipment. In some implementations, the PDCP and MAC configuration procedures can occur in parallel and/or can be combined into a single L2 Config/L2 Config Rsp procedure with two messages traversing the fronthaul. Further, similar to the RRC connection establishment procedure (shown in FIG. 7a), the RRC connection reconfiguration procedure can be optimized by combining the RRC messages with the L2 Config messages, thereby, reducing the two pairs of messages to one.

In some implementations, once a data radio bearer ("DRB") has been established with the RRC connection reconfiguration procedure, the eNodeB can activate the downlink S1 bearer with the EPC to start a data flow. However, the data flow might have to traverse the fronthaul and incur one segment delay before the user equipment state can be considered active.

Figure 7H:
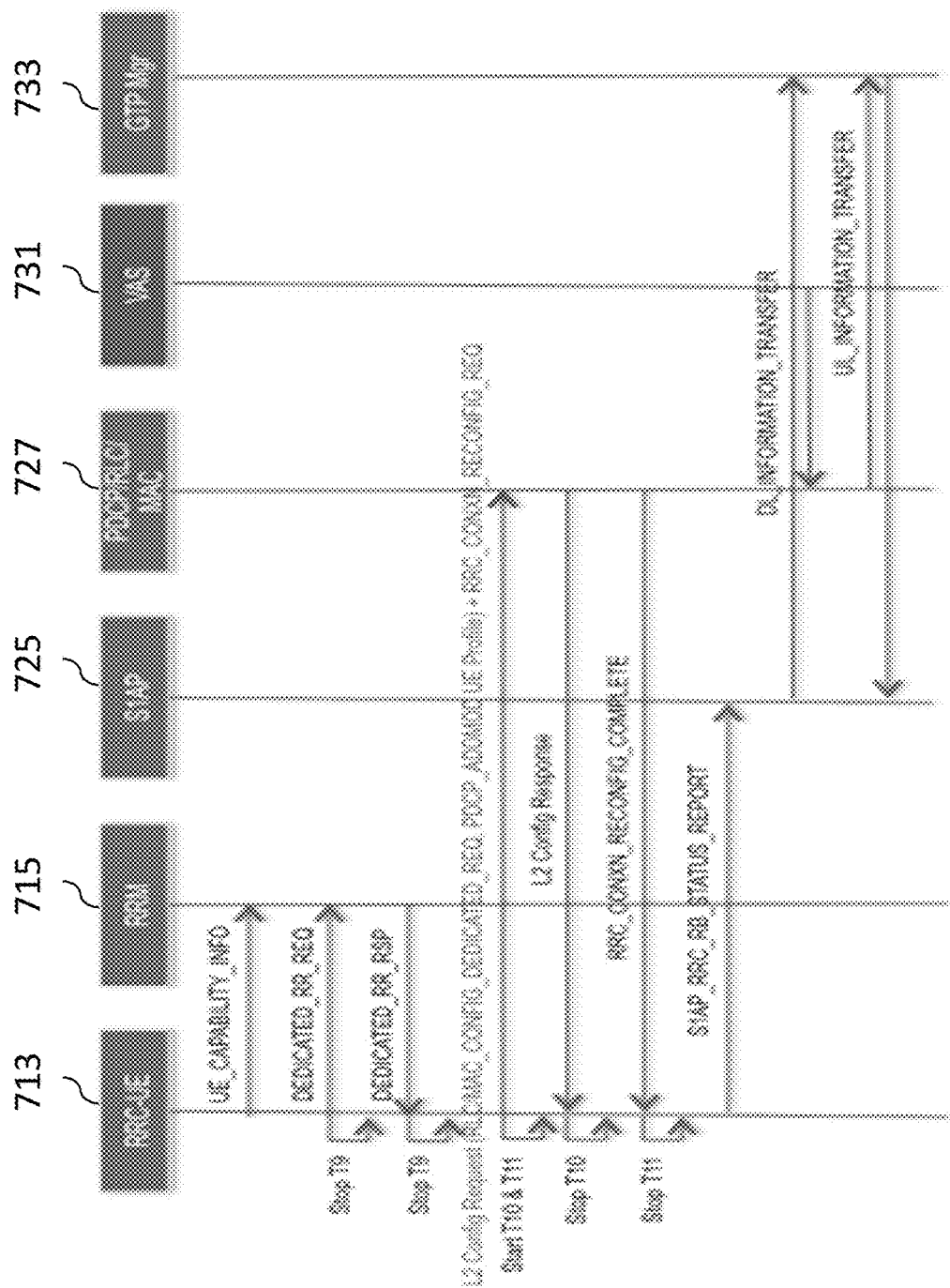

FIG. 7h illustrates an exemplary optimized procedures for RRC connection reconfiguration procedures, according to some implementations of the current subject matter. As shown in FIG. 7h, the "L2 Config Request" can be combined with the "RRC_CONXN_RECONFIG_REQ" message, where the "L2 Config Request" can include "RLC/MAC_CONFIG_DEDICATED_REQ" and "PDCP_ADDMOD UE Profile" messages, which can be sent to PCP/RLC/MAC 727 from the RRC-UE 713. An "L2 Config Response" message followed by "RRC_CONXN_RECONFIG_COMPLETE" message can be received at the RRC-UE 713. At this point, RRC-UE 713 can send "S1AP_RRC_RB_STATUS_REPORT" message to S1AP 725. Upon receipt of this message, the S1AP 725 can send a "DL_INFORMATION_TRANSFER" message to GTP Manager 733, which can contain information on the downlink. The PDCP/RLC/MAC 727 can send the "UL_INFORMATION_TRANSFER" message to GTP Manager 733, which can contain information on the uplink.

In some implementations, where the iBBU's can be centralized at the CO along with the EPC, the overall delay impact of the fronthaul can be offset by one S1-AP message, "S1AP_RRC_RB_STATUS_REPORT", and the start of the downlink data transfer from the EPC, both of which can have a zero transport delay.

In some exemplary, non-limiting implementations, the RRC connection establishment procedure can be performed in a total of 10 messages being traversed across the fronthaul if the iBBU is co-located with the macro cell and just 6 messages if the iBBU is co-located with the central office. As can be understood, the current subject matter system is not limited to the above indicated values.

D. RRC Connection Re-Establishment Procedure

FIGS. 8a-d illustrate an exemplary RRC connection re-establishment procedure, according to some implementations of the current subject matter. The RRC connection re-establishment procedure can include two stages: an RRC connection re-establishment request stage and an RRC connection re-configuration stage. Each stage's procedures can be similar to the RRC connection establishment procedures shown in FIGS. 7a-g.

Figure 8A:
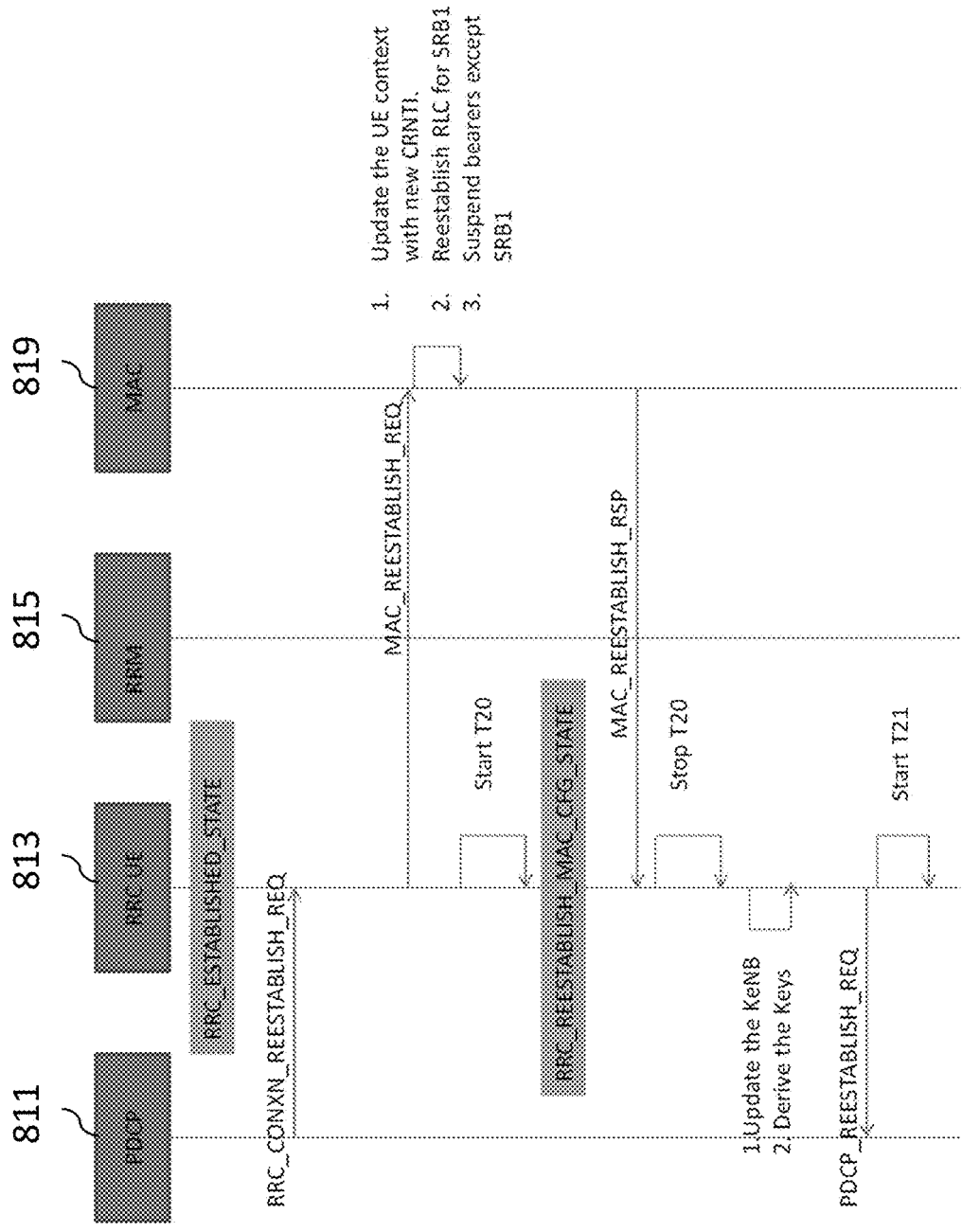
FIGS. 8a-d illustrate exemplary RRC connection re-establishment procedures, according to some implementations of the current subject matter.
Figure 8B:
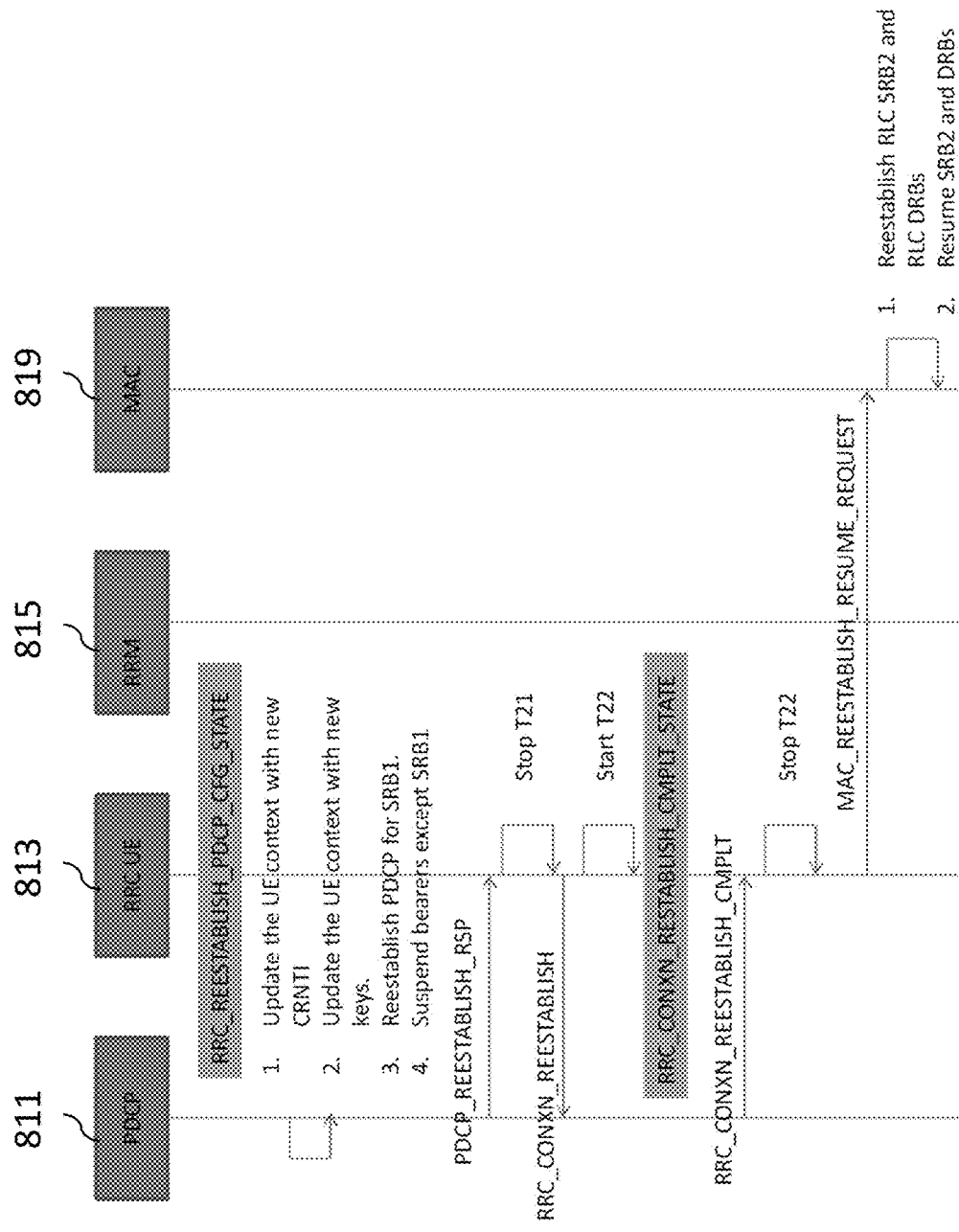
Figure 8C:
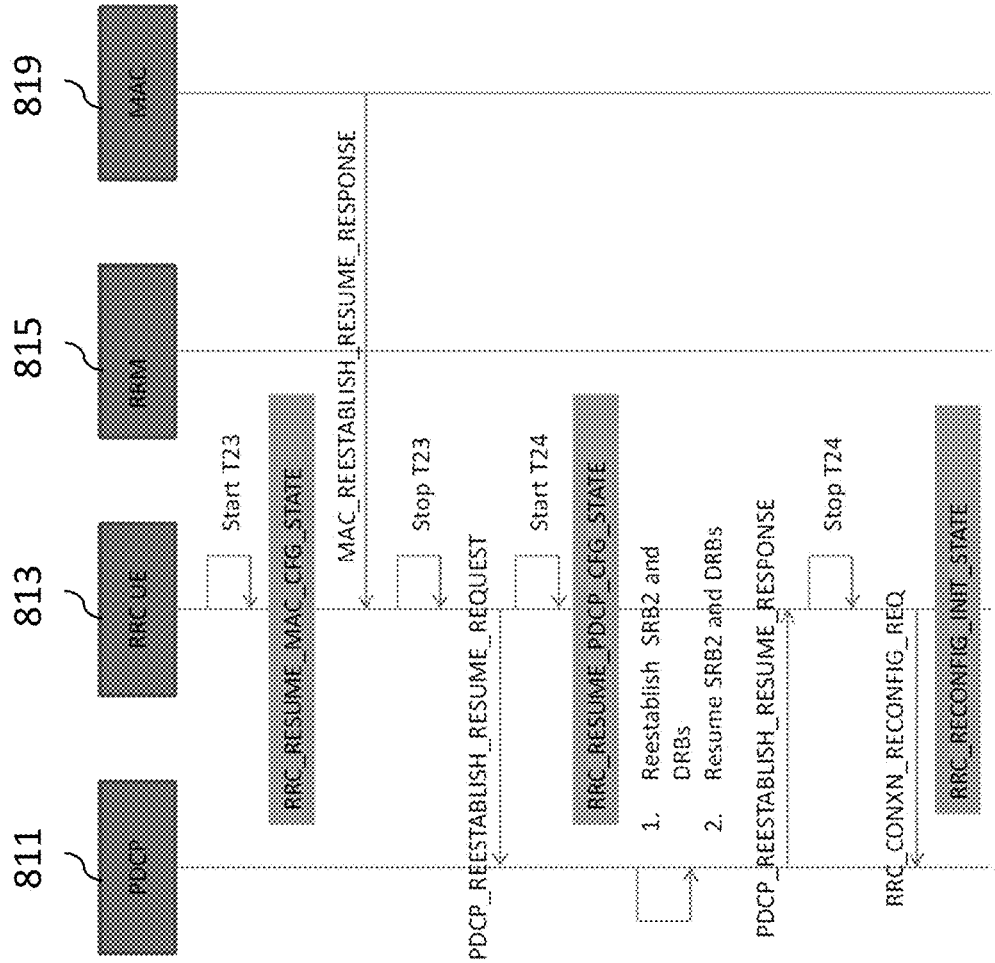

Similar to the RRC connection establishment procedure, the RRC connection re-establishment procedure can be initiated by sending a "RRC_CONXN_REESTALISH_REQ" message and can be completed by sending "RRC_CONXN_REESTABLISH_CMPLT" message. As shown in FIGS. 8a-c (and similar to the RRC connection establishment procedure), the RRC connection re-establishment procedure can include a pair of PDCP configuration messages ("PDCP_REESTABLISH_REQ" and "PDCP_REESTABLISH_RSP") and a pair of MAC configuration messages ("MAC_REESTABISH_REQ" and "MAC_REESTABLISH_RSP"), which can be followed by a pair of RRC messages ("RRC_CONXN_RECONFIG_REQ" and "RRC_ CONXN_REESTABLISH" and "RRC_CONXN_REESTABLISH_CMPLT") between the eNodeB and the UE. The PDCP and MAC configuration procedures can occur in parallel and/or can be combined into a single L2 Config/L2 Config Rsp procedure, which can result in one pair of messages traversing the fronthaul.

Figure 8D:
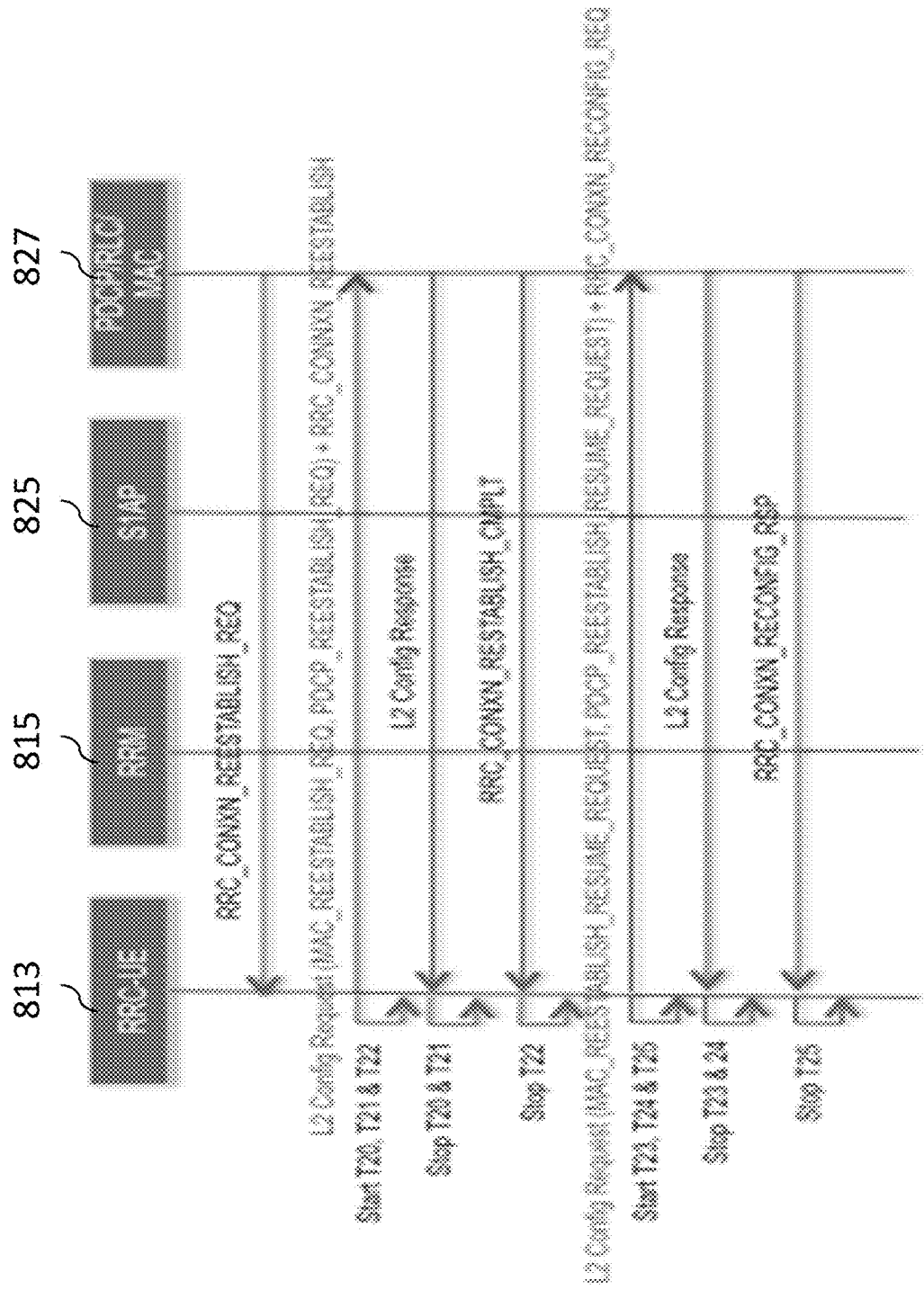

FIG. 8d illustrates an exemplary optimized RRC connection reestablishment procedure, according to some implementations of the current subject matter. As shown in FIG. 8d, the "RRC_CONXN_REESTABLISH" message can be combined with an "L2 Config Request" message, where the "L2 Config Request" message can include "MAC_REESTABLISH_REQ" and "PDPC_REESTABLISH_REQ" message, thereby reducing the two pairs of messages to one. This can be followed by an "L2 Config Response" message and "RRC_CONXN_REESTABLISH_CMPLT" message. Then, another combination of "L2 Config Request" message and "RRC_CONXN_RECONFIG_REQ" message can be sent, where the "L2 Config Request" message can include "MAC_REESTABLISH_RESUME_REQUEST" and "PDPC_REESTABLISH_RESUME_REQUEST" message, thereby reducing the two pairs of messages to one. This can be followed by an "L2 Config Response" message and "RRC_CONXN_RECONFIG_RSP" message.

In some exemplary, non-limiting implementations, the optimized procedure can involve 5 messages for RRC connection re-establishment procedure as opposed to 9 messages in a non-optimized procedure. As can be understood, the current subject matter system is not limited to the above indicated values.

Figure 9:
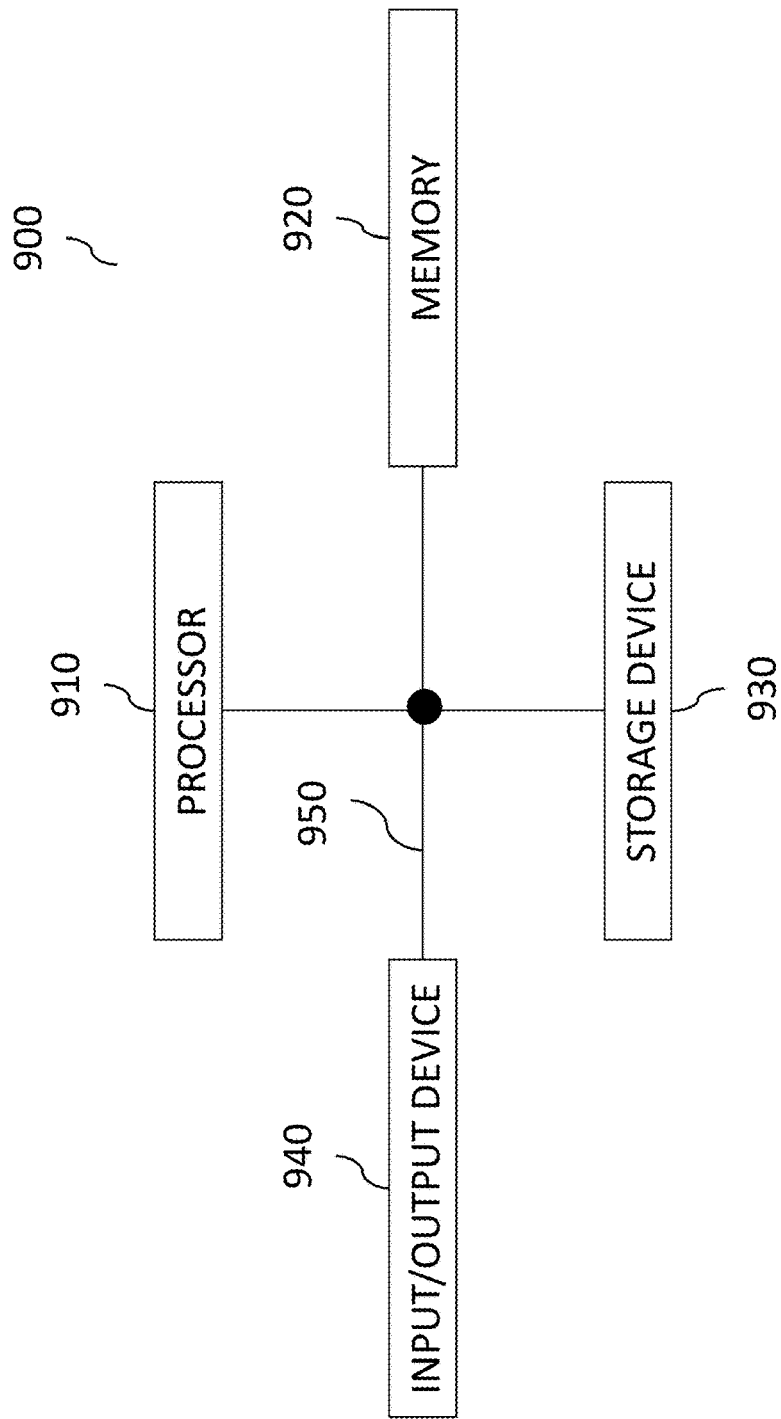
FIG. 9 illustrates an exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
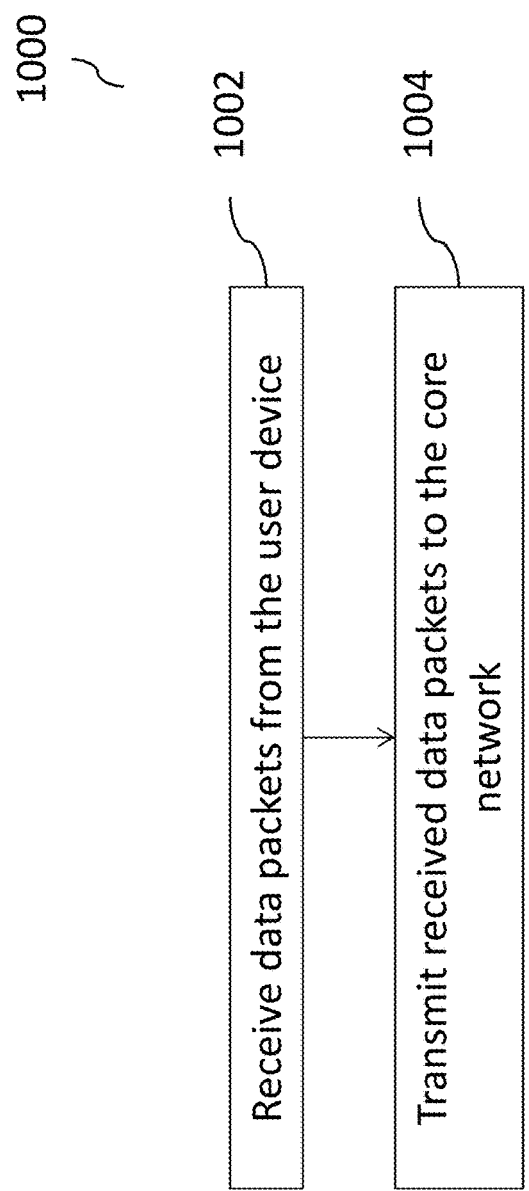
FIG. 10 illustrates an exemplary method, according to some implementations of the current subject matter.

FIG. 10 illustrates an exemplary method 1000 for coordinating communication of data packets between a user device and a core network, according to some implementations of the current subject matter. In some implementations, a first device (e.g., iBBU 304 as shown in FIG. 3) can be communicatively coupled to the core network 108 (as shown in FIG. 3) and a second device (e.g., iRRH 302) can be communicatively coupled to the first device. At 1002, data packets can be received from the user device by the second device. At 1004, the received data packets can be transmitted to the core network by the first device. In some implementations, the first device and the second device can share at least one functionality associated with layer 2 of a long term evolution radio access network.

In some implementations, the current subject matter can also include one or more of the following optional features. The first device can include at least a portion of an evolved node (eNodeB) base station. The second device can include a remote radio head. The remote radio head can include a radio transmitter and a radio receiver. In some implementations, the functionality shared by the first and second device can be a packet data convergence protocol ("PDCP").

In some implementations, the first device and the second device can be communicatively coupled via a fronthaul Ethernet connection. The first device can be communicatively coupled with the core network using a backhaul connection. At least one message in a plurality of messages can traverse the fronthaul Ethernet connection. The messages can be associated with establishing communication between the user device and the core network. The plurality of messages can include messages relating to layer 1 and/or layer 2 configuration and messages relating to establishing a radio resource control ("RRC") connection. In some implementations, the messages relating to layer 1 and/or layer 2 configuration can be combined with messages relating to establishing the RRC connection, which can reduce latency associated with the Ethernet fronthaul connection. The messages can also include messages relating to re-establishing the RRC connection. Further, in some implementations, the messages relating to layer 1 and/or layer 2 configuration can be combined with the messages relating to re-establishing the remote radio control RRC connection, which can also reduce latency associated with the Ethernet fronthaul connection.

In some implementations, a third device can be communicatively coupled to the core network. The third device can include at least one of the following: at least a portion of an evolved node (eNodeB) base station and a remote radio head. The first device and the third device can be at least one of the following: a macro cell and a micro cell. The first device and the third device can exchange a plurality of messages relating to handover. The messages exchanged between the first device and the third device can also include messages relating to layer 1 and/or layer 2 configuration. In some implementations, the messages relating to handover can be combined with messages relating to layer 1 and/or layer 2 configuration. In some implementations, at least one of the second device and the third device, upon detecting a reconfiguration of a connection with the user device, can begin transmission of data on a downlink connection connecting the user device and at least one of the second device and the third device.

In some implementations, the current subject matter can relate to a system (as well as a method and/or a computer program product) for coordinating communication of data packets between a user device and a core network. The system can include a communications device that can be communicatively coupled to the core network via a backhaul connection. The communications device can have at least one functionality associated with layer 2 of a long term evolution radio access network. In some implementations, the communications device can include at least a portion of an evolved node (eNodeB) base station, where the functionality can relate to packet data convergence protocol (PDCP).

In some implementations, the current subject matter can relate to a system (as well as a method and/or a computer program product) for coordinating communication of data packets between a user device and a core network. The system can include a first communications device that can receive at least one data packet from the user device. The first communications device can have at least one functionality associated with layer 2 of a long term evolution radio access network. In some implementations, the first communications device can include a remote radio head. The remote radio head can include a radio transmitter and a radio receiver. The functionality can relate to packet data convergence protocol (PDCP). Further, in some implementations, the first communications device can be communicatively coupled to a second device using a fronthaul Ethernet connection for exchanging at least one message relating to layer 1 and/or layer 2 configuration and/or establishing a radio resource control (RRC) connection using PDCP.

In some implementations, the current subject matter can relate to a communications device (as an associated method and computer program product), such as iBBU 304 shown in FIG. 3, that is a configured to be communicatively coupled to a core network (e.g., core network 108 shown in FIG. 3) and a remote radio head (e.g., an iRRH 302 shown in FIG. 3) for coordinating communication of data packets between a user device (e.g., user equipment 104 shown in FIGS. 1a-c) and the core network. The communications device can include a processing component (e.g., component 320 as shown in FIG. 3) having at least one functionality associated with layer 2 of a long term evolution radio access network (e.g., PDCP-upper as shown and discussed in connection with FIG. 4). The communications device and the remote radio head can be configured to share that functionality.

In some implementations, the current subject matter can also include one or more of the following optional features. The communications device can be a portion of an evolved node (eNodeB) base station. The communications device and the remote radio head can be communicatively coupled via a fronthaul Ethernet connection (e.g., fronthaul 306 shown in FIG. 3). The communications device can be communicatively coupled with the core network using a backhaul connection (e.g., backhaul 308 shown in FIG. 3).

In some implementations, at least one message in a plurality of messages can traverse the fronthaul Ethernet connection. The plurality of message can be associated with establishing communication between the user device and the core network. The messages can include messages relating to layer 1 and/or layer 2 configuration and messages relating to establishing a RRC connection. Further, the messages relating to layer 1 and/or layer 2 configuration can be combined with the messages relating to establishing the RRC connection. This can reduce latency associated with the Ethernet fronthaul connection as discussed above in connection with FIGS. 3-8d. In some implementations, the messages can include messages relating to re-establishing the RRC connection. Additionally, the messages relating to layer 1 and/or layer 2 configuration can be combined with the messages relating to re-establishing the RRC connection. This can further reduce latency associated with the Ethernet fronthaul connection, as discussed above in connection with FIGS. 3-8d.

In some implementations, another communications device (e.g., an iRRH and/or an iBBU) can be communicatively coupled to the core network and can communicate with the above communications device (e.g., iBBU 304). In some implementations, these devices can exchange a plurality of messages relating to handover. The messages can include messages relating to layer 1 and/or layer 2 configuration. Further, at least one message relating to handover can be combined with at least one message relating to layer 1 and/or layer 2 configuration. In some implementations, the remote radio head (e.g., iRRH 302), upon detecting a reconfiguration of a connection with the user device, can transmit data on a downlink connection connecting the user device and the remote radio head.

In some implementations, the current subject matter relates to a communications device (as well as an associated method and a computer program product) (e.g., iRRH 302) for coordinating communication of data packets between a user device and a second communications device (e.g., iBBU 304). The communications device can include a radio transmitter and a radio receiver (along power amplification component 312 and radio frequency component 314). The communications device can also include a processing component (e.g., component 318 as shown in FIG. 3) having at least one functionality associated with layer 2 of a long term evolution radio access network, which can be shared with the second communications device (e.g., iBBU 304). In some implementations, the communications device can be coupled to the second communications device (e.g., iBBU 304) using a fronthaul Ethernet connection. The communications device can be a remote radio head comprising a portion of an evolved node (eNodeB) base station. The communications device and the second communications device (e.g, iBBU 304) can be communicatively coupled via a fronthaul Ethernet connection and the second communications device (e.g, iBBU 304) is communicatively coupled with the core network using a backhaul connection. In some implementations, the communications device, upon detecting a reconfiguration of a connection with the user device, can transmit data on a downlink connection connecting the user device and the communications device.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for coordinating communication of a plurality of data packets, wherein a first radio device and a second radio device in a plurality of radio devices are communicatively coupled to a baseband unit device in a plurality of baseband unit devices, the method comprising:
   receiving, using the second radio device, data packets from at least one user device;
   transmitting, using the second radio device, the data packets to the first radio device;
   generating, using at least one of the first radio device and the second radio device, a buffer occupancy report;
   transmitting, at least one of the first radio device and the second radio device, the generated buffer occupancy report to the baseband unit device; and
   controlling transmission, by the baseband unit device, based on the generated buffer occupancy report, of one or more data packets between the baseband unit device and at least one of the first radio device and the second radio device;
   wherein the first radio device and the second radio device share at least one functionality associated with layer 2 of a long term evolution radio access network, the at least one functionality including a packet data convergence protocol (PDCP) functionality, the PDCP functionality is split between the first radio device, the second radio device, and the baseband unit device;
   wherein the baseband unit device includes a first PDCP portion of the at least one functionality, the first radio device includes a second PDCP portion and the second radio device includes a third PDCP portion of the at least one functionality, the first PDCP portion coordinates transmission of at least one compressed and sequence-numbered data packet from the baseband unit device to at least one scheduler of the first and second radio devices based on a buffer occupancy report generated by the third PDCP portion in the second radio device and transmitted to the first radio device.

2. The method according to claim 1, wherein
   the baseband unit device comprises at least a portion of an evolved node (eNodeB) base station;
   the first radio device and the second radio device include at least one a remote radio head, the remote radio head including a radio transmitter and a radio receiver,
   the baseband unit device is communicatively coupled with a core network using a backhaul connection;
   the first radio device and the second radio device are communicatively coupled with the baseband unit device using at least one fronthaul Ethernet connection, wherein a plurality messages being associated with establishing communication between the at least one user device and the core network.

3. The method according to claim 1, wherein
   the first radio device is a primary cell remote radio head communicatively coupled with the baseband unit;
   the second radio device is a secondary cell remote radio head communicatively coupled to the first radio device.

4. The method according to claim 1, further comprising
   executing a handover procedure from the first radio device to another first radio device in the plurality of first radio devices;
   communicating with the another first radio device; and
   transmitting at least one data packet using the another first radio device.

5. The method according to claim 1, further comprising
determining location of the at least one user device;
selecting another second radio device from the plurality of second radio devices based on the determined location of the at least one user device; and
transmitting at least one data packet using the selected another second radio device.

6. The method according to claim 1, wherein the transmitted at least one data packet is a compressed and sequence numbered data packet.

7. The method according to claim 1, further comprising
removing, by at least one of the first radio device and the second radio device, at least one data packet from a buffer of at least one of the first radio device and the second radio device based on a determination that the at least one data packet has expired.

8. The method according to claim 1, further comprising
allocating, by the first radio device, at least one radio link control (RLC) packet data unit (PDU) sequence number to the second radio device; and
determining, based on the allocated at least one RLC PDU sequence number, at least one unacknowledged packet data unit transmitted to the user equipment by the second radio device.

9. The method according to claim 1, further comprising
determining, by the second radio device, at least one user device that will transmit at least one data packet prior to transmission of the at least one data packet;
determining, by the second radio device, at least one physical uplink control channel (PUCCH) resource for use of a receipt of an acknowledgement/non-acknowledgement for a transmission of the at least one data packet by the second radio device to the at least one user device; and
providing, by the second radio device, the at least one determined PUCCH resource to the first radio device.

10. A system for coordinating communication of a plurality of data packets, wherein a first radio device and a second radio device in a plurality of radio devices are communicatively coupled to a baseband unit device in a plurality of baseband unit devices, the system comprising:
at least one memory; and
at least one processor operatively coupled to the memory, the at least one processor being configured to:
receiving, using the second radio device, data packets from at least one user device;
transmitting, using the second radio device, the data packets to the first radio device;
generating, using at least one of the first radio device and the second radio device, a buffer occupancy report;
transmitting, at least one of the first radio device and the second radio device, the generated buffer occupancy report to the baseband unit device; and
controlling transmission, by the baseband unit device, based on the generated buffer occupancy report, of one or more data packets between the baseband unit device and at least one of the first radio device and the second radio device;
wherein the first radio device and the second radio device share at least one functionality associated with layer 2 of a long term evolution radio access network, the at least one functionality including a packet data convergence protocol (PDCP) functionality, the PDCP functionality is split between the first radio device, the second radio device, and the baseband unit device;
wherein the baseband unit device includes a first PDCP portion of the at least one functionality, the first radio device includes a second PDCP portion and the second radio device includes a third PDCP portion of the at least one functionality, the first PDCP portion coordinates transmission of at least one compressed and sequence-numbered data packet from the baseband unit device to at least one scheduler of the first and second radio devices based on a buffer occupancy report generated by the third PDCP portion in the second radio device and transmitted to the first radio device.

11. The system according to claim 10, wherein
the baseband unit device comprises at least a portion of an evolved node (eNodeB) base station;
the first radio device and the second radio device include at least one a remote radio head, the remote radio head including a radio transmitter and a radio receiver,
the baseband unit device is communicatively coupled with a core network using a backhaul connection;
the first radio device and the second radio device are communicatively coupled with the baseband unit device using at least one fronthaul Ethernet connection, wherein a plurality messages being associated with establishing communication between the at least one user device and the core network.

12. The system according to claim 10, wherein
the first radio device is a primary cell remote radio head communicatively coupled with the baseband unit;
the second radio device is a secondary cell remote radio head communicatively coupled to the first radio device.

13. The system according to claim 10, wherein the operations further comprise
executing a handover procedure from the first radio device to another first radio device in the plurality of first radio devices;
communicating with the another first radio device; and
transmitting at least one data packet using the another first radio device.

14. The system according to claim 10, wherein the operations further comprise
determining location of the at least one user device;
selecting another second radio device from the plurality of second radio devices based on the determined location of the at least one user device; and
transmitting at least one data packet using the selected another second radio device.

15. The system according to claim 10, wherein the transmitted at least one data packet is a compressed and sequence numbered data packet.

16. The system according to claim 10, wherein the operations further comprise
removing, by at least one of the first radio device and the second radio device, at least one data packet from a buffer of at least one of the first radio device and the second radio device based on a determination that the at least one data packet has expired.

17. The system according to claim 10, wherein the operations further comprise
allocating, by the first radio device, at least one radio link control (RLC) packet data unit (PDU) sequence number to the second radio device; and
determining, based on the allocated at least one RLC PDU sequence number, at least one unacknowledged packet data unit transmitted to the user equipment by the second radio device.

18. The system according to claim 10, wherein the operations further comprise determining, by the second radio device, at least one user device that will transmit at least one data packet prior to transmission of the at least one data packet;

determining, by the second radio device, at least one physical uplink control channel (PUCCH) resource for use of a receipt of an acknowledgement/non-acknowledgement for a transmission of the at least one data packet by the second radio device to the at least one user device; and providing, by the second radio device, the at least one determined PUCCH resource to the first radio device.

19. A computer program product for coordinating communication of a plurality of data packets, wherein a first radio device and a second radio device in a plurality of radio devices are communicatively coupled to a baseband unit device in a plurality of baseband unit devices, comprising a non-transitory machine-readable medium storing instructions that, when executed by at least one programmable processor, cause the at least one programmable processor to perform operations comprising:

receiving, using the second radio device, data packets from at least one user device;

transmitting, using the second radio device, the data packets to the first radio device;

generating, using at least one of the first radio device and the second radio device, a buffer occupancy report;

transmitting, at least one of the first radio device and the second radio device, the generated buffer occupancy report to the baseband unit device; and controlling transmission, by the baseband unit device, based on the generated buffer occupancy report, of one or more data packets between the baseband unit device and at least one of the first radio device and the second radio device;

wherein the first radio device and the second radio device share at least one functionality associated with layer 2 of a long term evolution radio access network, the at least one functionality including a packet data convergence protocol (PDCP) functionality, the PDCP functionality is split between the first radio device, the second radio device, and the baseband unit device;

wherein the baseband unit device includes a first PDCP portion of the at least one functionality, the first radio device includes a second PDCP portion and the second radio device includes a third PDCP portion of the at least one functionality, the first PDCP portion coordinates transmission of at least one compressed and sequence-numbered data packet from the baseband unit device to at least one scheduler of the first and second radio devices based on a buffer occupancy report generated by the third PDCP portion in the second radio device and transmitted to the first radio device.

* * * * *